US009485097B2

(12) United States Patent
Rakan

(10) Patent No.: US 9,485,097 B2
(45) Date of Patent: Nov. 1, 2016

(54) DEVICE, SYSTEM, AND METHOD FOR REGISTERING AND AUTHENTICATING HANDWRITTEN SIGNATURES AND ARCHIVING HANDWRITTEN INFORMATION

(76) Inventor: Alkhalaf Rakan, Riyadh (SA)

(*) Notice: Subject to any disclaimer, the term of this patent is extended or adjusted under 35 U.S.C. 154(b) by 501 days.

(21) Appl. No.: 13/497,024

(22) PCT Filed: Jun. 22, 2011

(86) PCT No.: PCT/CA2011/000748
§ 371 (c)(1),
(2), (4) Date: Apr. 11, 2012

(87) PCT Pub. No.: WO2012/003570
PCT Pub. Date: Jan. 12, 2012

(65) Prior Publication Data
US 2012/0192250 A1  Jul. 26, 2012

(30) Foreign Application Priority Data
Jul. 6, 2010  (SA) .................................. 110310576

(51) Int. Cl.
*G06F 21/83* (2013.01)
*G06F 3/0354* (2013.01)
(Continued)

(52) U.S. Cl.
CPC ............. *H04L 9/3247* (2013.01); *G06F 3/038* (2013.01); *G06F 3/03545* (2013.01); *G06F 21/83* (2013.01); *H04L 9/3231* (2013.01); *H04L 63/08* (2013.01); *H04L 67/12* (2013.01)

(58) Field of Classification Search
CPC .................................................. H04L 9/3231
USPC .............................................................. 726/2
See application file for complete search history.

(56) References Cited

U.S. PATENT DOCUMENTS 5,544,255 A    8/1996   Smithies et al.
6,064,751 A    5/2000   Smithies et al.
(Continued)

FOREIGN PATENT DOCUMENTS

EP    1365314 A2   11/2003
WO    98/12661 A1   3/1998
WO    03017185 A1   2/2003

OTHER PUBLICATIONS

Jarrod Trevathan et al., Remote Handwritten Signature Authentication, 2005, Proceedings of the 2nd International Conference on Ebusiness and Telecommunication Networks (ICETE '05), pp. 335-339.*

(Continued)

*Primary Examiner* — Saleh Najjar
*Assistant Examiner* — Khang Do
(74) *Attorney, Agent, or Firm* — Hayes Soloway PC

(57) ABSTRACT

There is provided an electronic pen device configured to be used with a remote secure server for registering handwritten signatures, the secure server comprising an authentication database storing authentication information in connection with pre-registered users and a signature registration database for registering handwritten signatures, the electronic pen device comprising: an input/output (I/O) interface; a memory; a tip and capturing means connected thereto for capturing handwritten signatures; a network interface adapted to be connected to a data network, and a processing unit connected to the I/O interface, to the capturing means, to the memory and to the network interface. As another aspect of the invention, there is further provided a system for registering handwritten signatures. As another aspect of the invention, there is further provided a method of authenticating handwritten signatures. As a further aspect of the invention, there is provided a method of signing a document by a plurality of contracting user. As a further further aspect of the invention, there is provided an electronic pen device configured to be used with a remote server for archiving handwritten information.

16 Claims, 9 Drawing Sheets

(51) Int. Cl.
*G06F 3/038* (2013.01)
*H04L 9/32* (2006.01)
*H04L 29/08* (2006.01)
*H04L 29/06* (2006.01)

(56) References Cited

U.S. PATENT DOCUMENTS

| | | | |
|---|---|---|---|
| 8,737,614 B1 | 5/2014 | Mulligan | |
| 2001/0005855 A1 | 6/2001 | Shaw et al. | |
| 2002/0031243 A1 | 3/2002 | Schiller et al. | |
| 2002/0143683 A1 | 10/2002 | Taylor | |
| 2003/0078880 A1 | 4/2003 | Alley et al. | |
| 2004/0250070 A1 | 12/2004 | Wong | |
| 2005/0020303 A1* | 1/2005 | Chan | 455/556.1 |
| 2005/0141060 A1* | 6/2005 | Rydbeck | B41J 2/315 358/512 |
| 2005/0220060 A1 | 10/2005 | Takusagawa et al. | |
| 2006/0227121 A1 | 10/2006 | Oliver | |
| 2007/0090177 A1 | 4/2007 | Mitamura | |
| 2008/0072334 A1* | 3/2008 | Bailey | G06Q 10/10 726/28 |
| 2008/0231429 A1 | 9/2008 | Leonard et al. | |
| 2009/0049534 A1 | 2/2009 | Chung | |
| 2009/0077386 A1 | 3/2009 | Simonian | |
| 2009/0259588 A1 | 10/2009 | Lindsay | |
| 2010/0077478 A1* | 3/2010 | Hull et al. | 726/22 |
| 2010/0122327 A1* | 5/2010 | Linecker et al. | 726/6 |
| 2010/0158326 A1* | 6/2010 | Takeda | G06K 9/00154 382/119 |
| 2010/0161993 A1* | 6/2010 | Mayer | 713/178 |
| 2010/0263022 A1* | 10/2010 | Wynn et al. | 726/3 |
| 2010/0280859 A1 | 11/2010 | Frederick, II | |

OTHER PUBLICATIONS

Supplementary European Search Report, European Patent Application No. 11803037, dated Mar. 11, 2013, 4 pages.

Extended European Search Report, European Patent Application No. 11803037, dated Mar. 15, 2013, 7 pages.

International Search Report, International Patent Application No. PCT/CA2011/000748, date of completion Dec. 20, 2011, 7 pages.

Preliminary Report on Patentability and Written Opinion, International Patent Application No. PCT/CA2011/000748, dated Jan. 8, 2013, 8 pages.

Jarrod Trevathan et al., "Remote Handwritten Signature Authentication" Proceedings of the 2nd International Conference on Ebusiness and Telecommunication Networks (ICETE '05), 2005, pp. 335-339.

* cited by examiner

DEVICE, SYSTEM, AND METHOD FOR REGISTERING AND AUTHENTICATING HANDWRITTEN SIGNATURES AND ARCHIVING HANDWRITTEN INFORMATION

CROSS-REFERENCE TO RELATED APPLICATIONS

This application is a national phase application of International Application No. PCT/CA2011/000748, filed Jun. 22, 2011, designating the United States and claiming priority to Saudi Arabian Patent Application No. 110310576, filed Jul. 6, 2010, which is incorporated by reference herein in its entirety.

FIELD OF THE INVENTION

The present invention relates to management of handwritten information, and more particularly to a device, system and method for registering and authenticating a handwritten signature and a device for archiving handwritten information.

BACKGROUND OF THE INVENTION

Handwritten pen-on-paper signatures have been the basis of contracts in commerce for hundreds of years. One of the reasons is that the handwritten signature and the document on which it is applied are forever bound together by the ink being on the paper. Another advantage is that the signer can keep a copy or duplicate original of the contract to deter fraud.

However, the main difficulty encountering handwritten signatures is that the identity of the signatory cannot easily be ascertained when the document has been signed without witnesses. How can the signature applied on the document be authenticated? In other terms, how can a party having the singed document between his hands ascertain that the signature applied on the document has been written by the pretended signatory and not someone else?

The traditional remedy to this problem is to verify the identity of the signer by a trained forensic document examiner who is skilled in the art and science of signature character analysis, and who can testify, be qualified, and be cross-examined in a court of law if required.

If the signed document is an administrative document related to given administrative authority (such as a financial institution), another traditional remedy is to keep a model signature of the person in his administrative file with the administrative authority, and then use human judgement to compare the handwritten signature with the pre-registered model signature of the pretended signatory. However, since this method is based on human judgment, it is often object to human judgement errors which make it unreliable. It is usual for an administrative representative to commit a judgement error in comparing the signatures, thus resulting in approving a false signature or rejecting an authentic one. A judgement error can in certain situations involve legal liability of the administrative representative if, intentionally or by negligence, he rejected a signature that was authentic and caused a prejudice to the person by refusing to process the administrative document.

Recent developments in the field of data processing resulted in developing special technologies for authenticating a handwritten signature. Mainly, these technologies comprise capturing a handwritten signature, converting it to a digital format and using data processing utilities for comparing the captured signature with a pre-registered signature of the user. In addition of being complex and high costly, these technologies proved to be unreliable in certain circumstances.

From the electronic documents perspective, the continuing development of electronic document storage and retrieval as well as data processing and computer technologies has created a recognized need to an inclusion of legally effective signatures for creating legally binding electronic records.

The same authentication problem occurs for handwritten signatures applied on electronic documents. Early systems addressing this need utilized a simple image of a signature (such as a bit map) being affixed to a document as a picture of a signature. This approach had the disadvantage that the bit map image of the signature is difficult to verify as being directly from the hand of the signer, in that little if any dynamic data is present. Also, an image of a signature can easily be scanned from an existing document or record and improperly inserted into a document as a forgery.

Later systems included computer algorithms for verifying a signature prior to the user being able to sign an electronic document. Problems with this method include potential for errors in the verification algorithm, and the inability to demonstrate the accuracy of verification of a signature to a layperson or in a court of law. Further, the signatures are typically not transportable to systems having different algorithms without loss of data precision.

For example, U.S. Pat. No. 5,544,255 to Smithies et al. discloses a computer-based system for capturing and verifying a handwritten signature of an electronically stored document by capturing the signature and storing a set of statistical measurements in a signature envelope that can contain a checksum of the document. The measurements can include shape, number of pen strokes, total line length, average stroke length, number of acceleration and deceleration maxima events, the overall time taken to complete the signature, and the pen down time. The system can also contain a database of known signature measurement templates to be compared with a submitted signature to produce a similarity score. This system illustrates the main limitations of traditional systems for authenticating handwritten signatures. In fact, according to the system provided by Smithies, the first problem is that the signature envelopes cannot be verified by a forensic document examiner using traditional methods. Besides, the signature envelopes are not readily transportable to future systems, being based on arbitrary measurement statistics of the handwritten signatures. Also, the signature envelopes are ineffective to the extent that they omit information originally contained in the handwritten signature itself. Moreover, the system is highly complex, costly and slow due to the overall process of comparing signatures.

On the other hand, there are areas where use of electronic devices for typing information is unpopular, non-convenient or inaccessible. For example, in the legal world, lawyers and judges are known to be very classical people who prefer to handwrite information using a conventional paper format document rather than typing information using electronic devices. Judges are generally not ready to replace the classical way of handwriting notes by electronic means for typing information. Lawyers usually have a plurality of active files, where each file is associated with a particular mandate related to a particular client. Lawyers handwrite information related to their files in various occasions, for instance, in the frame of a legal consultation, a meeting with a witness and in the frame of taking personal notes on specific aspects of the file. Also, lawyers frequently handwrite information in connection with their client files in the courthouse, for instance in order to note a hearing date, a name of a judge and the terms of minutes or a judgement stated by a judge. In the same way, judges are assigned specific litigation files and generally take notes in various occasions in connection with their files, for instance, in the frame of taking notes during a trail and an interlocutory hearing.

In the medical field, doctors usually handwrite information on paper format documents of various natures, such as medical prescriptions and personal diagnosis notes associated to their patients. Because it is generally time consuming to photocopy or otherwise data process handwritten information using conventional methods, medical documents (ex. prescriptions) handwritten by doctors are sometimes handed to patients without keeping a copy thereof inside the patient file. This situation can create traceability problems of the patient medical history.

In general, handwritten paper format documents are generally indexed and classified in paper format files for future reference. Physical files can occupy a huge storage space and are vulnerable to accidents (such as fire) and fraudulent attempts (such as burglary). It is also common nowadays to scan and store in computer databases all handwritten paper format documents. However, this process of archiving handwritten information a posteriori is expensive and time consuming since it requires time and human resources for scanning and classifying the documents.

SUMMARY OF THE INVENTION

It is therefore an object of the present invention to provide a device, a system and a method that overcome the above drawbacks.

As a first aspect of the invention, there is provided an electronic pen device configured to be used with a remote secure server for registering handwritten signatures, the secure server comprising an authentication database storing authentication information in connection with pre-registered users and a signature registration database for registering handwritten signatures, the electronic pen device comprising:

- an input/output (I/O) interface; a memory; a tip and capturing means connected thereto for capturing handwritten signatures; a network interface adapted to be connected to a data network, and a processing unit connected to the I/O interface, to the capturing means, to the memory and to the network interface;
- where the electronic pen device obtains personnel identification information originating from a user desiring to sign, automatically authenticates the user by inquiring the remote secure server using the personnel identification information, and if a successful authentication, captures the handwritten signature, associates a unique signature identifier thereto, and transmits the captured handwritten signature to the remote secure server via the data network for storage in association with the user and the unique signature identifier, and communicates the unique signature identifier to the user in order to be used as a reference during future authentication of the handwritten signature.

Preferably, the secure server further comprises a condition subsequent database for storing conditions subsequent associated with handwritten signatures registered inside the signature registration database, and where the electronic pen device is configured to enable a user to input a condition subsequent associated with a signature handwritten thereby, and to transmit the condition subsequent to the secure server via the data network for storage in connection with the handwritten signature inside the condition subsequent database for future inquiry.

Preferably, the electronic pen device is further configured to enable a user to input user identification information associated with at least one other user and to initiate a request to invite the at least one other user to sign a document, where the electronic pen device transmits the invitation request and the user identification information to the secure server for generating a unique document identifier and for transmitting an invitation to sign the document comprising the unique document identifier to the at least one other user.

Preferably, the electronic pen device is further configured to receive through the data network an invitation to sign a document comprising a unique document identifier, to communicate a message about the invitation to a user in possession of the electronic pen device, to capture a signature handwritten by the user in association with the document and to transmit the handwritten signature to the secure server along with the document identifier via the data network for storage inside the signature registration database.

Preferably, the personnel identification information comprises a user name and a password which is specified by the user using the I/O interface.

Preferably, the I/O interface comprises a touch screen.

The Preferably, the unique signature identifier is generated by the remote secure server and is transmitted to the electronic pen device via the data network.

Preferably, the authentication information comprises physical coordinates defining a security region within which the electronic pen device shall be located, the electronic pen device further comprising a GPS chip for tracking a physical location of the device, wherein the authenticating the user comprises inquiring the remote secure server for verifying if the tracked physical location is within the security region.

Preferably, the network interface is wireless and the data network comprises a satellite connection.

As a further aspect of the invention, there is provided a system for registering handwritten signatures, the system comprising:

- an authentication database comprising authentication information associated with pre-registered users;
- a signature registration database for registering handwritten signatures;
- a network interface adapted to be connected to a data network; and
- a first processing unit adapted to be connected to the authentication database, to the signature registration database and to the network interface, where the processing unit is configured to receive a request for registering a handwritten signature comprising personnel identification information associated with a user, to inquire the authentication database as a function of the personnel identification information, and if a successful authentication, to generate a unique signature identifier, to receive a signature handwritten by the user on a given support, to associate the unique signature identifier with the handwritten signature, to store the handwritten signature into the signature registration database in association with the user and the unique signature identifier, and to communicate the unique signature identifier to a device held by the user in order to be used as a reference during future authentication of the handwritten signature.

Preferably, the system further comprises a user device configured to capture the handwritten signature, to enable the user to input the personnel identification information, to transmit the handwritten signature and the personnel identification information to the first processing unit via the data network, to receive the unique signature identifier transmitted by the first processing unit via the data network, and to enable the user to take note of the unique signature identifier.

Preferably, the system further comprises a condition precedent database storing conditions precedent associated with at least a part of the pre-registered users, wherein the first processing unit is configured to inquire the condition precedent database about any condition precedent in record in connection with the user, and if it is the case, to verify if the condition precedent has been fulfilled, where the first processing unit is configured to reject the request of registering a handwritten signature if a condition precedent is found in record and the condition has not been fulfilled.

Preferably, the system further comprises a condition subsequent database storing conditions subsequent associated with handwritten signatures stored in the signature registration database, and a second processing unit configured to inquire the condition subsequent database about any condition subsequent in record in connection with a given handwritten signature, and if it is the case, to verify if the condition subsequent has been fulfilled.

Preferably, the system further comprises a Web site connected to the condition subsequent database to allow pre-authorized persons to add and edit conditions subsequent.

Preferably, the user device is further configured to enable the user to input user identification information associated with at least one other user, to enable the user to initiate a request to invite the at least one other user to sign a document, to transmit the invitation request and the user identification information to the first processing unit through the data network, where the first processing unit is configured to generate a unique document identifier and to transmit an invitation to sign the document comprising the unique document identifier to the at least one other user.

Preferably, the user device is further configured to receive through the data network an invitation from another user to sign a document comprising a unique document identifier, to communicate a message about the invitation to the user in possession of the user device, to capture a signature handwritten by the user in association with the document and to transmit the handwritten signature to the first processing unit along with the document identifier via the data network for storage inside the signature registration database.

The system wherein the user device is an electronic pen device.

Preferably, the electronic pen is a ball point pen, and the sensor means comprise a movement sensor for capturing movement of the ball point.

The user device can also be a scanning device comprising means for scanning the handwritten signature.

Preferably, the personnel identification information comprises a user name and a password.

Preferably, the authentication information comprises physical coordinates defining a security region within which the user device shall be located, the user device further comprising a GPS module for tracking a physical location thereof, wherein the authenticating the user comprises inquiring the authentication database for verifying if the tracked physical location is within the security region.

As another aspect of the invention, there is provided a method of authenticating handwritten signatures, the method comprising:
  receiving, at a processing unit, a signature handwritten by a user on a given support and personnel identification information associated with the user;
  automatically authenticating, by the processing unit, the user using the personnel identification information by inquiring an authentication database storing authentication information in connection with pre-registered users;
  if a successful authentication, automatically generating, by the processing unit, a unique signature identifier, automatically associating the unique signature identifier to the handwritten signature, automatically storing the handwritten signature into a signature registration database in association with the user and the unique signature identifier, and automatically communicating the unique signature identifier to the user in order to be used as a reference during future authentication of the original handwritten signature;
  providing access to the signature registration database for enabling another party to authenticate the signature handwritten on the given support, where the authentication is carried out by verifying if the signature appearing on the given support is substantially identical to the electronic reproduction stored in association with the unique signature identifier.

Preferably, the given support is a paper support, and the signature has been written by the user using an electronic pen by which it has been captured and transmitted to the processing unit.

As a further further aspect of the invention, there is provided a method of signing a document by a plurality of contracting users, the method comprising:
  receiving, from a first user, a request of signing a document by a plurality of contracting users;
  receiving user identification information associated with the contracting users;
  generating a unique document identifier in connection with the document to be signed;
  transmitting an invitation to sign the document to each one of the contracting users along with the unique document identifier;
  providing access to the document content to the contracting users before signing;
  receiving handwritten signatures associated with the contracting users;
  authenticating the contracting users, where the authenticating comprises verifying if the handwritten signatures originate from the contracting users; and
  registering the handwritten signatures inside a signature registration database in connection with the document and with each one of the users.

As another aspect of the invention, there is provided an electronic pen device configured to be used with a remote server for archiving handwritten information, the device comprising means for capturing handwritten information, a user interface for enabling a user to specify a folder identifier associated with the remote server within which handwritten information shall be classified, a network interface adapted to be connected to a data network and a processing unit connected thereto for transmitting the captured handwritten information to the remote server in order to be classified within the identified folder.

Preferably, the remote server is a secure remote server whereby the user shall be authenticated before accessing to content thereof, wherein the user interface receives user identification information associated with the user, and wherein the processing unit first authenticates the user by inquiring the remote secure server using the user identification information.

Preferably, the processing unit inquires the remote server about existence of the identified folder and transmits the captured handwritten information to the remote server only if the folder identifier exists.

Preferably, if the folder identifier does not exist, the processing unit instructs the remote server to open a new folder having the specified identifier and to classify the captured handwritten information within the new created folder.

Preferably, the electronic pen further comprises a memory wherein the captured handwritten information is stored for a later time before classifying it into the remote server.

BRIEF DESCRIPTION OF THE DRAWINGS

Further features and advantages of the present invention will become apparent from the following detailed description, taken in combination with the appended drawings, in which.

DETAILED DESCRIPTION OF THE INVENTION

I—Handwritten Signature Registration and Authentication

Figure 1:
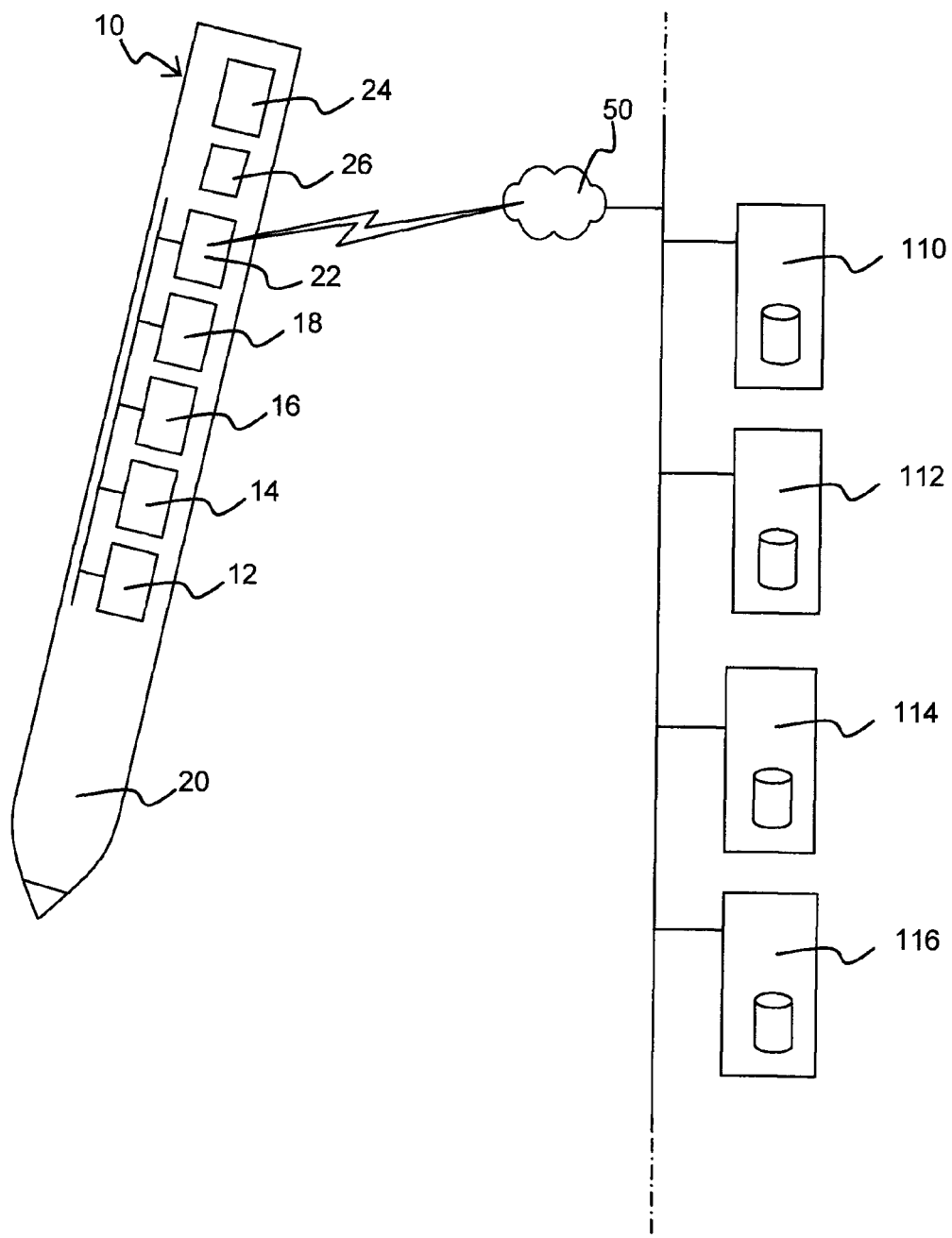
FIG. 1 depicts a general schematic diagram of an electronic pen device connected, via a data network, to remote databases (an authentication database and a signature registration database)

One of the main aspects of the present invention is to provide a device, a system and a method for registering (and authenticating) a handwritten signature. The main objective is to enable a third party to authenticate a handwritten signature when the signatory has signed outside the presence of said third party. Though most of the examples will be given using a signature handwritten on a document (paper support), a person skilled in the art shall understand that the application of the system, device and method according to the present invention is not limited to a hand signature written on a paper support, but is extended as well to a signature applied on an electronic support or any other support.

For example, one of the applications of the present system, device and method is to register (and authenticate) a signature handwritten on an administrative document. Indeed, there is a need for an administrative authority to authenticate a handwritten signature applied on an administrative document when the signatory has signed outside the presence of the administrative authority. Without an appropriate system for registering and authenticating the signature, the administrative authority cannot ascertain the identity of the signatory.

The present invention has a broad utility for administrative authorities, such as financial institutions, governmental entities, and universities. For instance, most of financial transactions involve signature of administrative documents, such as cheques, money transfer documents, etc. In order to secure a given transaction, the signature shall, in principle, be authenticated by the financial institution before approving the transaction in question. This doesn't raise a problem when the signatory signs the document in front of a representative of the administrative authority who can physically check up on the identity of the signatory by requiring an identity card with photo for example. The issue mostly occurs when the signatory signs a document in the absence of the administrative authority, and then transmits the signed document—for example by mail, fax or any other telecommunication medium—to the administrative authority for processing. How can the administrative authority authenticate the signature applied on the document? In other terms, how can the administrative authority ascertain that the signature applied on the document has been written by the pretended signatory and not someone else? The present invention provides a remedy to this problem.

The system for registering (and authenticating) a handwritten signature in accordance with the present invention requires, as a preliminary step, building an authentication database in connection with registered users. User registration is fundamental for enabling users to be authenticated later on using the system, device and method provided in accordance with the present invention. User Registration can be done by any convenient registration means in such a way that each registered user shall be associated with unique user identification information, such as a combination of user name and password or a biometric identifier—such as a user fingerprint.

Essentially, user registration is carried out using a secure database (authentication database) wherein each registered user is mapped with corresponding user identification information. As a concrete example, a bank desiring to use the system for authenticating a signature in accordance with the present invention should first start by registering its clients by allocating user identification information for each client and storing said user identification information in an authentication database accessible for inquiry through a data network. In this case, the bank can certainly use its pre-existent resources (i.e. existent authentication databases) for use in connection with the present invention.

The system, device and method for registering (and authenticating) a signature in accordance with the present invention is facilitated by existence of a determined group of users related to a given authority (ex. bank-clients, government-citizens, company-employees, university-students), where these users are preregistered and can be authenticated using a secured authentication database related to the given authority.

However, a person skilled in the art shall understand that a secure authentication database can be built for all kind of users (not related to a given authority), thus enabling all these users to benefit from the present system, device and method for registering (and authenticating) a signature. For example, a secure authentication database can be built, managed and administrated by an independent person or entity. This can be done by enabling any person to register as a user of said authentication database by presenting appropriate identity evidence to ensure that he or she is well the person he or she pretends to be (ex. by presenting a copy of a valid passport, a driver license, etc.).

Figure 2:
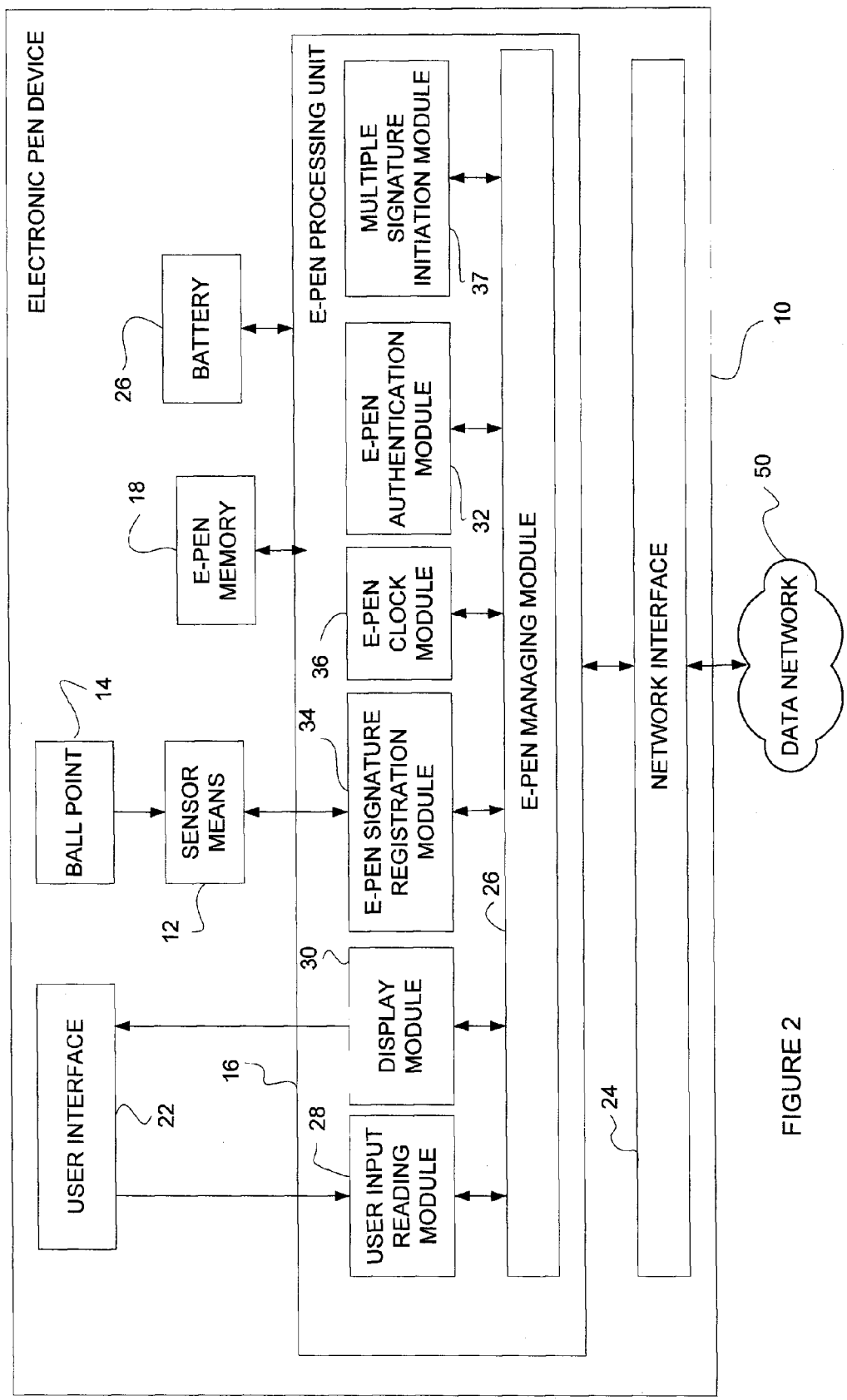
FIG. 2 depicts a block diagram of an electronic pen device configured to be used with a secure server for registering a handwritten signature in accordance with a preferred embodiment of the present invention.
Figure 3:
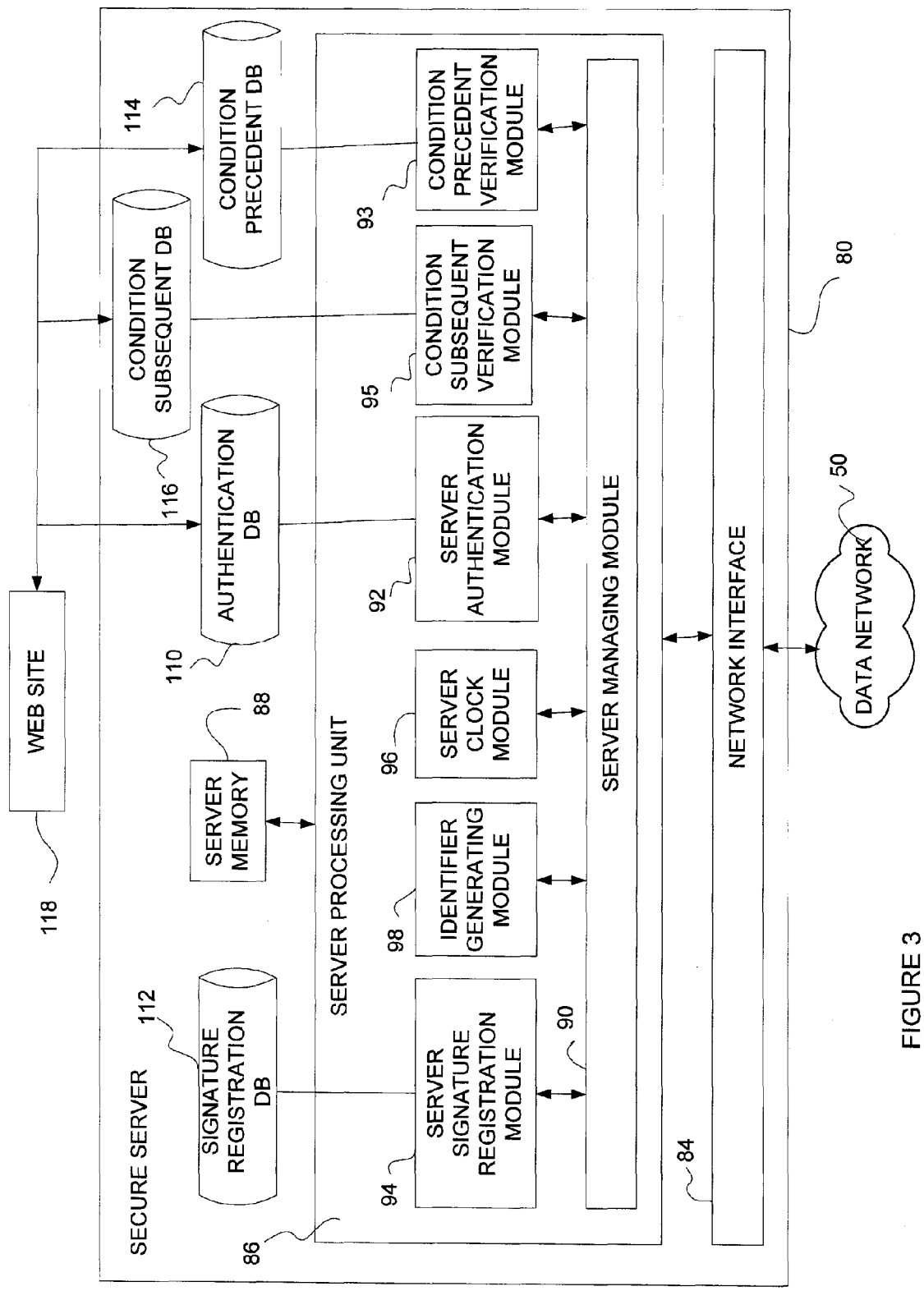
FIG. 3 depicts a block diagram of secure server configured to be used with an electronic pen device for registering a handwritten signature in accordance with a preferred embodiment of the present invention.

FIGS. 1, 2 and 3 illustrate an example of a system for registering (and authenticating) a signature in accordance with a preferred embodiment of the present invention. The functionality of the present system is illustrated using a signatory signing an administrative document associated with an administrative authority. However, as mentioned hereinabove, a person skilled in the art shall understand that this is a particular application in a particular context in which the invention can be applied, and the system described hereinafter is merely an example of how such a system can be implemented.

A person skilled in the art shall also understand that the key element of the present invention is to authenticate the signatory by inquiring an authentication database, to map a unique signature identifier to a signature handwritten by said signatory, to acquire an electronic reproduction of the handwritten signature and to register (store) the latter along with the unique signature identifier in a signature registration database. The unique signature identifier is communicated to the user who shall communicate it to a party interested in authenticating the handwritten signature. The support which is used to write the signature can vary. For example, it can be a paper support, an electronic support or any other support. The type of document on which the signature is written can be any type of document, such as an administrative document, an agreement between two or more parties, a unilateral agreement or the like. Moreover, the involved parties can also vary. The signatory can be any individual and the interested party (who is interested to authenticate the signature) can be any individual, corporation or other entity (ex. a beneficiary of a signed cheque, a cosignatory of an agreement, an administrative authority, a government or the like). Moreover, the party managing or otherwise controlling user registration in the authentication database can be any trusted party, such as an interested party (party interested in authenticating certain type of documents—such as an administrative authority) or any independent party.

A—Signature Registration: Basic Structure and Functionalities

As shown by FIGS. 1 and 2, from the user (i.e. signatory) end, the system comprises an electronic pen device (hereinafter "electronic pen" or "e-pen") 10 adapted to communicate with a remote secure server 80 associated with an administrative authority. The electronic pen 10 shall be used by the user to sign any administrative document related to the administrative authority. The electronic pen comprises sensor means 12, a ball point 14, an e-pen processing unit 16, an e-pen memory 18, a housing 20, a user interface 22, an e-pen network interface 24 and a battery 26. The remote secure server 80 comprises a server network interface 84, a server processing unit 86, a memory 88, an authentication database 110 and a signature registration database 112.

The electronic pen 10 may be preferably represented by a substantially pen-shaped body defined by the housing 20. The housing 20 houses one or more integrated circuits and other electronic components which comprises the sensor means 12, the ball point 14, the e-pen processing unit 16, the e-pen memory 18, the user interface 22, the e-pen network interface 24 and the battery 26.

The sensor means 12 consist of any known technology capable of capturing handwritten information drawn by the ball point 14, such as, a movement sensor, an infrared or laser tracking device, an optical sensor or any other suitable technology. In a preferred embodiment, the sensor means 12 comprise a combination of a movement sensor and an appropriate tracking device capable of capturing a signature handwritten by a user with a sufficient high resolution such that the captured signature can be reproduced with a substantially high degree of accuracy, even when it comprises two or more parts. The tracking device is preferably an infrared device appropriately mounted for tracking a signatory hand motion in order to accurately recognize a full signature even when the latter is composed of at least two non continuous parts.

The e-pen processing unit 16 is the central element of the electronic pen and is connected to the sensor means 12, to the memory 18, to the user interface 22 and to the e-pen network interface 24. The e-pen processing unit 16 is responsible for coordinating all the operations of the other components of the electronic pen, in accordance with predefined instructions. The e-pen processing unit 16 comprises an e-pen microprocessor (or microcontroller) for executing instructions (not shown), an e-pen managing module 26, a user input reading module 28, a display module 30, an e-pen authentication module 32, an e-pen signature registration module 34 and an e-pen clock module 36.

The e-pen managing module 26 is responsible for controlling and coordinating all data and commands that are exchanged between the e-pen processing unit 16 and the other components of the electronic pen, knowing the user interface 22, the e-pen network interface 24 and the sensor means 12. The e-pen managing module 26 is also responsible for controlling and coordinating the execution of all the other modules of the e-pen processing unit 16 and, thus, is connected to each one of these modules, knowing the user input reading module 28, the display module 30, the e-pen authentication module 32, the e-pen signature registration module 34 and the e-pen clock module 36.

The e-pen memory 18 comprises a main memory (internal memory) at which the first processing unit 16 has access. In a preferred embodiment, the memory 18 further comprises a secondary storage (external memory) for storing, when required, handwritten data captured and communicated by the sensor means 12.

In a preferred embodiment, the user interface 22 consists of a micro touch screen enabling the user to interactively communicate with what is displayed on the screen using his finger; however the user interface 22 can also consist of any other two-way communicational interface such as combination of a micro keyboard and display or a two-way audio interface. Optionally, the user interface 22 may be extended through a wireless remote keyboard and display device (not shown), such as a dedicated device, a cellular phone, a PDA, or any other suitable device which may communicate wirelessly with the electronic pen 10 through a wireless network such as a Bluetooth™, Wi-Fi wireless network or the like. The identification information entered by the user through the user interface 22 can consist of a National ID number, an alphanumeric personal acronym and password combination, or the like. Though, according to a preferred embodiment, the user information is entered manually by the user using a touch screen, it should be understood it can be entered using any other alternative process. For example, the identification information may be hand written by the user and captured by the sensor means 12 of the electronic pen 10.

The user interface 22 displays certain information and allows the user to enter data when he is instructed to do so via a message appearing on the screen. All the operations of the micro touch screen are securely synchronized and controlled by the e-pen processing unit 16, in the sense that no data is communicated to the user interface for display and no data entered by the user via that user interface is processed unless authorized by the e-pen processing unit 16.

As will be discussed more in details hereinafter, the user interface 22 communicates to the user various information, comprising messages and instructions to the user (ex. instructions to enter identification information), a unique identifier to be associated with a given signature, a status of the electronic pen 10 at a given temporal moment, the time and date of the signature and error messages when it is the case. The user interface 22 is used by the user to enter data, such as his identification information, or to select an option from a list, and the like.

The e-pen network interface 24 is a conventional wireless network interface adapted to be connected to a data network 50 through which it communicates with another network interface 84 located at a remote secure server 80 associated with the administrative authority. In one embodiment, the data network 50 comprises a wireless local area network such as a Bluetooth™ and a Wi-Fi wireless connected to a wide area network such as the Internet. In this case, the electronic pen 10 is completely wireless and communicates with the remote secure server 80 via the wireless local area network and the wide area network. In another embodiment, the data network comprises a satellite data network through which data is exchanged between the electronic pen 10 and the secure server 80. The network interfaces 24 and 84 are adapted to exchange data between the electronic pen 10 and the secure server 80.

As shown by FIGS. 1 and 3, at the administrative authority side, there is provided a secure server 80 comprising a server network interface 84, a server processing unit 86, a server memory 88, an authentication database 110 and a signature registration database 112. The secure server 80 may consist of a single or a plurality of servers, and the databases 110 and 112 can be locally or remotely connected to the secure server 80. A person skilled in the art shall understand that these databases 110 and 112 can be grouped into one physical database or be divided into a plurality of separate databases. The server memory 88 comprises a main memory (internal memory) at which the server processing unit 86 has access.

The server processing unit 86 is connected to the server network interface 84, to the server memory 88, to the authentication database 110 and to the signature registration database 112. The server processing unit 86 is responsible for coordinating all the activities of the secure server in accordance with predefined instructions set up by the different modules defined hereinafter. The server processing unit 86 comprises a server microprocessor (or microcontroller) for executing instructions (not shown), a server managing module 90, a server authentication module 92, a server signature registration module 94, a server clock module 96, and an identifier generating module 98.

At an initial stage, the e-pen managing module 26 transmits a signal instructing the display module 30 to display on the user interface 22 a message asking the user if he wishes to register a signature. The display module 30 proceeds in displaying such a message on the user interface 22 and confirms the same to the e-pen managing module 26. Then, the e-pen managing module 26 transmits a signal to the user input module 28 instructing the latter to read the data entered by the user via the user interface 22. The user input reading module 28 reads the data and transmits it to the e-pen managing module 26 upon reception. If the answer is positive, the e-pen managing module 26 transmits a signal to the display module 30 instructing the latter to display a message asking the user to enter his identification information for authentication purposes.

The display module 30 displays the message to the user on the user interface 22 and confirms the same to the e-pen managing module 26 which instructs the user input reading module 28 to read the data entered by the user via the user interface 22, and waits for data entry by the user. When the identification information is entered by the user, the user input reading module 28 transmits the identification information to the e-pen managing module 26 which receives it and transmits it to the e-pen authentication module 32 with an instruction to the latter to build an authentication request in order to authenticate the user.

The e-pen authentication module 32 builds an authentication request (using a database language corresponding to the language used by the authentication database 110—such as SQL) comprising the user identification information and waits for instructions from the e-pen managing module 26. Before processing the authentication request, the e-pen managing module 26 transmits a signal to the e-pen clock module 36 instructing the latter to synchronize its clock with the secure server clock.

The e-pen clock module 36 (located at the electronic pen side) sends a clock synchronization request to the sever clock module 96 (located at the secure server side) through the data network 50. A clock synchronization process is carried out between the two modules 36 and 96. This process can be carried out using any known clock synchronization process. The objective is to have the clock of the electronic pen synchronized with the clock of the secure server in order to have the same date and time set up for both sides 10 and 80. Once the clocks are synchronized, the e-pen clock module 36 transmits a signal to the e-pen managing module 26 with an indication of successful clock synchronization.

A person skilled in the art shall understand that in order to have the time and location of the user, a GPS chip can be included in the e-pen where it can locate the e-pen's location and thus can determine the time and date depending on such location. The chip would take into consideration the difference in time zones, for example when the e-pen is located in a zone where it is Monday and the server is located in another place where the time zone there is still Sunday night.

Then, the e-pen managing module 26 transmits a signal to the e-pen authentication module 32 instructing the latter to start the authentication process. The e-pen authentication module 32 proceeds then in transmitting the authentication request to the secure server 80 through the data network 50. The authentication request is received by the server managing module 90 which acquires the request and transmits it to the server authentication module 92 with an instruction to inquire the authentication database 110. The server authentication module 92 inquires the authentication database 110 using the identification information embedded in the authentication request. The server authentication module 92 transmits an authentication response to the server managing module 90 comprising an indication if a successful or unsuccessful authentication.

The server managing module 90 receives the authentication response from the server authentication module 92. If an unsuccessful authentication, the server managing module 90 transmits an indication of an unsuccessful authentication to the e-pen authentication module 32 (at the electronic pen side) through the data network 50. The e-pen authentication module 32 transmits an authentication failure signal to the e-pen managing module 26 which instructs the display module 30 to display a failure authentication message to the user via the user interface 22.

If a successful authentication, the server managing module 90 communicates with the server clock module 96 and gets the actual date and time which is deemed to be the time and date of the user authentication. The server managing module 90 stores the authentication date and time temporally in the server memory 88 in association with said user. Then, the server managing module 90 generates an encryption code unique to the given user and transmits to the e-pen authentication module 32 a signal comprising an indication of a successful authentication along with the generated encryption code. The electronic pen 10 shall use the encryption code to encrypt all subsequent messages transmitted to the secure server 80 in association with said user.

The e-pen authentication module 32 transmits an indication of a successful authentication along with the encryption code to the e-pen managing module 28. The latter instructs the display module 30 to display to the user a message of a successful authentication along with a message instructing the user to write his signature on the administrative document using the electronic pen 10.

The e-pen managing module 26 then transmits a signal to the e-pen signature registration module 34 instructing the latter to read the user signature. The e-pen signature registration module 34 instructs the sensor means to sense the movement of the ball point 14 and to capture the signature of the user. The e-pen signature registration module 34 receives the signature handwritten by the user and confirms the same to the e-pen managing module 26 which communicates with the e-pen clock module 36 to receive the actual date and time that is deemed to be the date and time of the signature. The e-pen managing module sends a signal to the display module comprising an indication that the signature has been successfully captured with an indication of the date and time when the signature has been captured, and instructs the user to indicate the indicated date and time on the signed administrative document.

The e-pen managing module 26 transmits the encryption code to the e-pen signature registration module 34 and instructs the latter to register the captured signature at the remote secure server 80. The e-pen signature registration module 34 encrypts the captured signature using the encryption code and transmits a signature registration request comprising the encrypted captured signature to the secure server 80 via the data network 50.

The server managing module 90 receives the signature registration request. Upon reception of the signature registration request, first the server managing module 90 communicates with the identifier generating module 98 requesting therefrom to generate a unique signature identifier in order to be mapped to the received signature. Then, the server managing module 90 decrypts the received signature using the encryption code, communicates with the server clock module 96 to get the actual date and time that is deemed to be the signature registration date and time, extracts the authentication date and time from the server memory 88, and transmits the signature along with the unique signature identifier and the authentication and the signature registration dates and times to the server signature registration module 90 instructing the latter to proceed in registering the signature with the corresponding information.

Preferably, the unique signature identifier consists of an alphanumeric code. The identifier generating module 98 generates the unique signature identifier pursuant to any appropriate algorithm such as each generated identifier shall be unique and different of any past or future generated signature identifier. Preferably, all generated identifiers are stored in an internal database. This database is automatically inquired every time a new signature identifier is generated in order to make sure that the newly generated signature identifier has not been allocated to another signature in the past.

The server signature registration module 94 stores the signature along with the unique signature identifier, the authentication date and time, and the signature registration date and time in the signature registration database 112 in association with the user. When this operation is successfully terminated, the server signature registration module 94 transmits a signal confirming the same to the server managing module 90 which transmits an indication of a successful signature registration along with the unique signature identifier to the electronic pen 10.

The e-pen signature registration module 34 receives the signal and transmits a confirmation signal to the e-pen managing module 26 comprising the unique signature identifier. The e-pen managing module 26 transmits the unique signature identifier to the display module 30 instructing the latter to display to the user the unique signature identifier on the user interface 22 and to display a message to the user instructing him to take note of the unique signature identifier, preferably to be indicated on the administrative document. It shall be noted that for a further security reasons, the unique signature identifier can instead be communicated to the user to an independent personal device associated with said user, such as his cell phone or PDA.

After the operation is terminated, the result is as follow: from the user end, the administrative document has been signed by the user using the electronic pen 10. The administrative document contains the user handwritten signature, as well as the unique signature identifier and the date and time of the signature that has been communicated to the user using the user interface. From the administrative authority end, the user signature, the unique signature identifier, the date and time of the authentication as well as the date and time of the signature registration have been stored in the signature registration database 112 in association with the user.

The signature registration database 112 is connected to at least one computer terminal associated with the administrative authority. When the administrative authority receives an administrative document signed by the user, an agent of the administrative authority shall proceed in authenticating the signature. To do so, the agent inquires the signature registration database 112 using the unique signature identifier indicated on the administrative document. If the unique signature identifier doesn't exist in the database 112, the agent can conclude that the signature is non authentic. If the unique signature identifier exists, the agent extract the corresponding handwritten signature stored in the database 112 and verifies if it is identical (or substantially identical to the loss of precision while capturing the signature) to the one that appears on the administrative document.

This verification is easy to carry out and doesn't require a thorough human judgement since the agent shall conclude to an authentic signature only if the two signatures are identical (and not similar). For supplemental safety, the agent can also verify if the date and time of the signature and appearing on the administrative document is valid. To do so, the agent compares the date and time that appears on the administrative document with the date and time of the authentication and the date and time of the signature registration that are stored in the signature registration database 112 in association the unique signature identifier. In fact, the date and time of the signature appearing on the administrative document shall be within the time frame starting from the time the user has been authenticated (authentication date and time) and ending when the signature has been registered in the database 112 (signature registration date and time). If it is the case, the agent shall conclude to an authentic signature.

As an option, the e-pen user can also specify an expiration fixed time for the signature where it won't be accepted after a specific date. It may also be unaccepted before a specific date or time.

In a preferred embodiment, once the signature has been authenticated, the agent stores in the database an indication that the document in relation with the given unique signature identifier has been verified and processed. He prepares as well a digest of the document and stores it in the signature registration database 112 in connection with the unique signature identifier. This enables the administrative authority to keep track of all the processing operations in connection with the unique signature identifier.

Since each unique signature identifier is mapped to only one document, the administrative authority would be able to repeal any eventual fraudulent attempt to use the same signature and unique signature identifier in connection with an irrelevant document. This could happen when a party with a fraudulent intent records the signal generated at the signing using sensors and then uses the recorded signal to create a forged signature. This could also happen when a fraudulent party cuts or copies signature data from a document and attaches it to an irrelevant document. If more than one document holding the same unique signature identifier is presented to the administrative authority for processing, the system will be able to track the duplicate and the administrative authority can strike down the fraudulent attempt.

B—Signature Registration Subject to a Condition Precedent:

According to a further embodiment of the present invention, the Server processing unit 86 further comprises a condition precedent verification module 93 connected to a condition precedent database 114. The server managing module 90 is connected to the condition precedent verification module 93. The condition precedent database 114 is configured to store conditions precedent associated with the pre-registered users and to enable inquiry of these conditions when required (see FIG. 3).

A Condition precedent is defined as an event, a state or an action that is required to be met before that the signature can be registered inside the signature registration database 112. The event, the state or the action that is required can be stated positively inside the condition precedent database 114 (in the sense that said event, state or action must occur) or negatively (in the sense that said event, state or action must fail to occur). The condition precedent can be defined and stored inside the condition precedent database 114 by a pre-determined authorized person, such as the signing user, the administrative authority and the government. Thus, in connection with each pre-registered user, one or more condition precedent(s) can be defined and stored inside the condition precedent database 114.

Once the signature has been transmitted by the electronic pen 10 and received by the server managing module 90, the latter shall first inquire the condition precedent database 114 via the condition precedent verification module 93 in order to verify if a condition precedent has been defined in connection with the given user. If no condition precedent has been defined, the server managing module 90 proceeds in transmitting the signature to the server signature registration module 94 for storage inside the signature registration database 112, and then it proceeds in transmitting the signature identifier to the user according to the process described hereinabove. However, if a condition precedent has been defined, the server managing module 90 shall first make sure that the condition precedent is met before sending the signature for registration inside the signature registration database 112 and the remaining process is carried out.

The condition precedent can consist of an action to be carried out by the secure server 80 immediately before registering the signature. For example, transmitting a sms message to the user (at his/her mobile phone) and receiving a return sms therefrom confirming that he/she is indeed the person performing the registration process. This can be seen as a supplementary security measure for authenticating the user.

The condition precedent can also consist of a totally independent state or event that must occur independently of any prior action by the secure server 80 in order for the latter to be able to transmit the signature for registration. For example, the user must be at least 18 years old.

Since condition precedents can be defined in connection with certain users at the exclusion of others, it might be inefficient to inquire the condition precedent database 114 at each time the secure server 80 receives a signature registration request from a user. As a solution to this inefficiency, the authentication database 110 can be configured to keep, for each user, an indication if a condition precedent exists in association therewith and, where there is a plurality of possible condition precedent databases, the database identity in which the condition precedent is defined. The database identity is communicated to the server managing module 90 which shall communicate with the identified condition precedent database in order to retrieve the condition precedent kept in record.

A person skilled in the art shall understand that the condition precedent database 114 can be either grouped into one physical database with one and/or the other of the signature registration database 112 and the authentication database 110 or divided into a plurality of separate databases. A person skilled in the art shall also understand that the server managing module 90 can either be locally connected to the condition precedent database 114 or remotely connected thereto via a data network. In the preferred embodiment, users pre-registered in the condition precedent database 114 are the same as those pre-registered in the authentication database 110, which users can be identified in both databases (condition precedent DB 114 and authentication DB 110) using the same identification information. However, a person skilled in the art shall understand that these databases might not have an exact duplicate of pre-registered users and/or might not have same identification information for identifying these users.

i) Particular Application for Signing Cheques:

Signing and processing cheques is presented herein as a particular application of the embodiment described hereinabove. According to this application, the document subject to a signature is a cheque and the condition precedent consists of an availability of a sufficient amount of funds in the bank account that would cover for the amount of the cheque to be signed. In this optic, after successful user authentication, the user should specify, using the touch screen of the electronic pen, the value of the cheque that he/she desires to sign. The value is transmitted to the server managing module 90 which shall first inquire the condition precedent database 114 via the condition precedent verification module 93 about the condition precedent defined in connection with the user. In this particular case, the condition precedent database 114 comprises the amount of funds available for the user. If the user has more than one bank account, in one embodiment, the user can identify the desired bank account using the user interface of the electronic pen. In another embodiment, there is provided a distinct electronic pen for each distinct bank account, where the electronic pen is configured to function in association with said specific bank account.

If the amount of the cheque to be singed by the user is inferior or equal to the available amount of funds indicated in the condition precedent DB 114, the server managing module 90 transmits a positive signal to the user and proceeds in registering the signature inside the signature registration database 112 and in transmitting the unique signature identifier to the user. Then, the server managing module 90 sends a signal to the condition precedent verification module 93 with instructions to update the amount of sufficient funds indicated in the condition precedent database 114 to take into account the amount of the cheque that has been signed by the user. As an optional application, the server managing module 90 transmits a certification request comprising the cheque amount and the user identity to the financial institution in order to certify the cheque. The financial institution certifies the cheque by freezing the amount of money inside the user bank account. This can be seen as an automated process for certifying a cheque.

If the amount of the cheque signed by the user is superior to the available amount of funds indicated inside the condition precedent DB 114, the condition precedent is then considered not met and the server managing module 90 transmits a failure signal to the user and refrains from registering the signature inside the signature registration database 112 (and obviously from generating any signature unique identifier).

This particular application is highly useful in the financial arena, especially in countries where signing cheques without sufficient provisions is considered as a criminal offense. In case where a user attempts to overturn the authentication system and to defraud his co-contractor (beneficiary of the cheque) by specifying to the system a smaller amount than the amount he writes on the cheque (in order to have a unique signature identifier and get his signature registered), this would be considered as a clear evidence of his criminal intent to defraud his co-contractor.

ii) Particular Application for Signing Contracts by Unemancipated Persons

Signing and processing contracts by unemancipated persons (such as minors and incompetent adults) is another particular application of the embodiment described hereinabove. According to this application, the condition precedent consists of obtaining the prior consent of the legal guardian of the unemancipated person. In fact, in most jurisdictions, certain types of contracts signed by unemancipated persons are unenforceable against them unless the prior consent of their legal guardian has been obtained prior to the signature of the contract.

In this optic, during the authentication process of the user, the server managing module 90 is configured to determine if the user in question is unemancipated. This is done by storing an indication to this effect in the authentication database 110 or in any other database that shall be inquired by the server managing module during or after user authentication. Thus, the server managing module 90 shall reject any signature registration request initiated by an unemancipated person unless the condition precedent associated therewith is met. This is carried out by inquiring the condition precedent database 114 via the condition precedent verification module 93.

The condition precedent can be stored in the form of obtaining a prior consent of a given legal guardian if the amount to be contracted by the unemancipated user (value of the contract) is superior to a predetermined amount and/or if is not related to the purchase of essential needs such as food and shelter. If it is the case, the server managing module 90 shall communicate with the legal guardian identified inside the condition precedent database 114 in order to obtain his prior consent before registering any signature. Once the consent is obtained by the server managing module 90, the latter proceeds in delivering a unique signature identifier to the user and in acquiring and registering the signature inside the signature registration database 112. The server managing module keeps records of the guardian consent preferably in the signature registration database 112 along with the signature of the unemancipated person.

Communication with the guardian can be carried out using any preconfigured medium of communication, such as an email or a sms message. The communication process with the legal guardian is initiated by the server managing module 90 and is carried out via the data network 50. The data network 50 can comprise the Internet, a wireless phone network or any other data network suitable for communicating with third persons who do not have electronic pens.

When the legal guardian has in his possession an electronic pen 10 as it is the case of the unemancipated user, the identifier of the guardian's electronic pen 10 (ex. Mac Address) is kept in record inside the condition precedent database 114 in order for the server managing module 90 to be able to read the identifier and to send the consent request directly to the corresponding electronic pen. The legal guardian will then be able to respond to the consent request (by approving or declining the request) via the e-pen user interface 22. In this optic, the server managing module 90 generates a contract unique identifier and a consent request comprising the amount and nature of the contract to be approved. This information is then transmitted to the guardian via the electronic pen in his possession. The guardian responds to the consent request by approving or declining the contract. The consent response is then received by the server managing module 90 and, if the contract was approved by the guardian, the consent is registered inside the signature registration database 112 along with the signature of the unemancipated person.

The condition precedent database 114 can also store a list of pre-approved persons with who the unemancipated user has the right to contract. An example of a pre-approved person can be the landlord.

A person skilled in the art shall understand that the server managing module 90 can be configured to request any appropriate information from the user in order to carry out the consent inquiry before allowing the unemancipated user to sign the contract.

C—Signature Registration Subject to a Condition Subsequent

According to a preferred embodiment of the present invention, as showed in FIG. 3, there is provided a condition subsequent verification module 95 connected to a condition subsequent database 116.

The condition subsequent database 116 is configured to store conditions associated with signatures (or documents) that have already been captured (or signed) and registered inside the signature registration database 112. The condition subsequent database 116 is configured to enable inquiry of these conditions when required.

A Condition subsequent is defined as an event, a state or an action that, if it occurs (or fails to occur) at the time of processing the document, brings an end to the signature (document) validity. The event, the state or the action that is required can be stated positively inside the condition subsequent database 116 (in the sense that said event, state or action must occur) or negatively (in the sense that said event, state or action must fail to occur) in order to bring end to the signature validity. The condition subsequent can be defined and stored inside the condition subsequent database 116 by any pre-determined authorized legal person, such as the user, the administrative authority or the government. Thus, for each signature registered in connection with a given document, one or more condition subsequent(s) can be defined and stored inside the condition subsequent database 116 in association therewith.

Unlike signature registration subject to a condition precedent where the signature is not registered inside the signature registration database 112 unless the condition precedent has previously been met, in the case of signature registration subject to a condition subsequent, the signature is registered inside the signature registration database 112 however mapped to a condition subsequent that shall occur (or fail to occur) before the time of processing the document in order for the signature to be considered valid at that particular time.

The method of processing a document mapped to a condition subsequent can be described as follow: as a first step, the signature is authenticated in accordance with the above described process and system of authenticating a handwritten signature. As a second step, the condition subsequent database 116 is inquired in order to find out if any condition subsequent has been mapped to the signature (document). If it is the case, the third step consists of verifying whether the condition subsequent has been met at that given time. If the condition subsequent has not been met, then the signature validity fails at that given time and the document processing is rejected. If the condition has already been met, then the signature is considered valid and the document is accepted for processing.

A person skilled in the art shall understand that the condition subsequent database 116 can be either grouped into one physical database with one and/or the other of the signature registration database 112, the authentication database 110 and the condition precedent database 114 or divided into a plurality of separate physical databases. A person skilled in the art shall also understand that the condition subsequent verification module 95 can be connected to the server managing module 90 or can be totally unconnected therewith and managed independently thereof. In the preferred embodiment, users pre-registered in the condition subsequent database 116 are the same as those pre-registered in the authentication database 110 and in the condition precedent database 114, which users can be identified in all these databases (condition subsequent DB 116, condition precedent DB 114 and authentication DB 110) using the same identification information. However, a person skilled in the art shall understand that these databases might not have an exact duplicate of pre-registered users and/or might not have same identification information for identifying these users.

i) Particular Application for Specifying a Signature Expiration Date

As a particular application of the above embodiment is to map a signed document to a specific expiry date after which the document ceases to be valid and will be considered null and void. In this case, the signature remains valid until arrival of the expiry date. If the document is not processed before the expiry date, then it becomes null and void.

To illustrate this particular application, let's take the scenario where a user is ready to sign a cheque to a third person, however desires to impose a restriction on the delay within which the cheque can be cashed. In order to do so, he can sign a cheque and map it to a specific expiry date as a condition subsequent to the signature registration. The expiry date will then be stored inside the condition subsequent database 116 in connection with the captured signature. If the beneficiary deposes the cheque after expiration of the expiry date, it shall then be rejected by the financial institution. This would be useful for instance where the user makes an offer of settlement conditional to acceptance before a specific date. In this case, the user can emit a cheque for settlement, however binding it to a specific expiry date after which the cheque cannot be cashed.

Another scenario is where a user delivers a cheque in a given currency (ex. US Dollars) to pay a bill in another currency (ex. Euro). The cheque amount is generally calculated according to the currency exchange rate at the date the cheque is made. If the beneficiary waits too long before cashing the cheque, he can take advantage of the difference in the currency rate to obtain undue supplementary amount of payment. The solution to this would be for the user to specify an expiry date after which the cheque ceases to be valid. In this case, the beneficiary will be obliged to cash the cheque before the expiry date, otherwise will be obliged to go back to the user in order to negotiate a new amount.

ii) Particular Application for Specifying a Currency Exchange Rate Upper Limit

Another particular application of this embodiment is to map to a signed cheque a currency exchange rate upper limit as a condition subsequent. In this case, the system will register the user signature inside the signature registration database 112, however will assort the signature with a currency exchange rate upper limit as a condition subsequent. The cheque will be considered valid when the actual currency exchange rate is inferior to the upper limit specified by the user and will be considered invalid when currency exchange rate exceeds the specified upper limit. In this application, the validity of a cheque can alternate in time as a function of the currency exchange rate, without the need for the user to cancel the cheque and emit a new one. When the beneficiary deposit the cheque at the financial institution, the latter will verify if the currency exchange rate upper limit is respected, otherwise will decline to cash the cheque and will invite the beneficiary to wait until the currency exchange rate changes in such a way that the specified upper limit is respected. If the beneficiary doesn't want to wait, he shall then negotiate a new amount with the user.

iii) Particular Application for Obtaining the Approval of a Third Party

A further particular application of this embodiment is to emit a cheque however conditional to a third party's prior approval. This particular application can be useful where a user desires to emit a cheque conditional on the prior execution of a given action by the beneficiary and where the beneficiary wants to be sure to be paid if he carries out the given action. In this case, a third party can be assigned by the contracting parties as a middleman (or mediator) who shall verify if the given action is carried out and shall give his approval to cash the cheque if the action has effectively been executed. International commerce is often subject to these kinds of agreements where a first party located in a first country orders wares from a second party located in a second country. In this case, a middleman is usually assigned by the parties to instruct if the shipped wares are in accordance with the contract signed by the party and if it is the case, he gives his instructions to the financial institution in order to transfer the agreed amount of money.

According to the present innovation, the user can emit a cheque mapped to a condition subsequent suspending the validity of the cheque until a positive signal is received from a predetermined third party (i.e. the middleman). When the beneficiary deposits the cheque, the financial institution will be able to trace that the cheque is mapped to a condition subsequent and to verify if the condition subsequent has been met, knowing if the third party has registered his approval inside the condition subsequent database 116. If it is the case, the cheque shall be processed and cashed. Otherwise, the cheque shall be declined by the financial institution.

In the preferred embodiment, the condition precedent database 114 and the condition subsequent database 116 are accessible via a Web site 118 allowing for remotely accessing and updating the databases 114 and 116 by preauthorized persons. Any pre-registered user would be able to use the Web site 118 to access the databases in order to add a new condition and modify or cancel a previously added condition precedent or condition subsequent.

iv) Particular Application for Specifying a Specific Number of Usages

In some cases, it is useful to specify that a signed document (or a given captured signature) can only be processed one time; in other terms, the document (or the signature) will stop to be valid after it has been processed for a first time. In fact, it is possible in our days for fraudulent people to duplicate a signature handwritten on a document to produce another document with a fraudulent duplicate of the signature. To avoid this situation, while signing a document, the user can specify that the usage number is limited to one. In this case, once the document has been processed, a record is stored inside the condition subsequent database 116 indicating that the document has already been processed. If a fraudulent party attempts to process a fraudulent document with a duplicated signature, by inquiring the condition subsequent database 116, the system will be able to strike down the fraudulent attempt.

D—Signature Registration: Plurality of Users

Figure 4A:
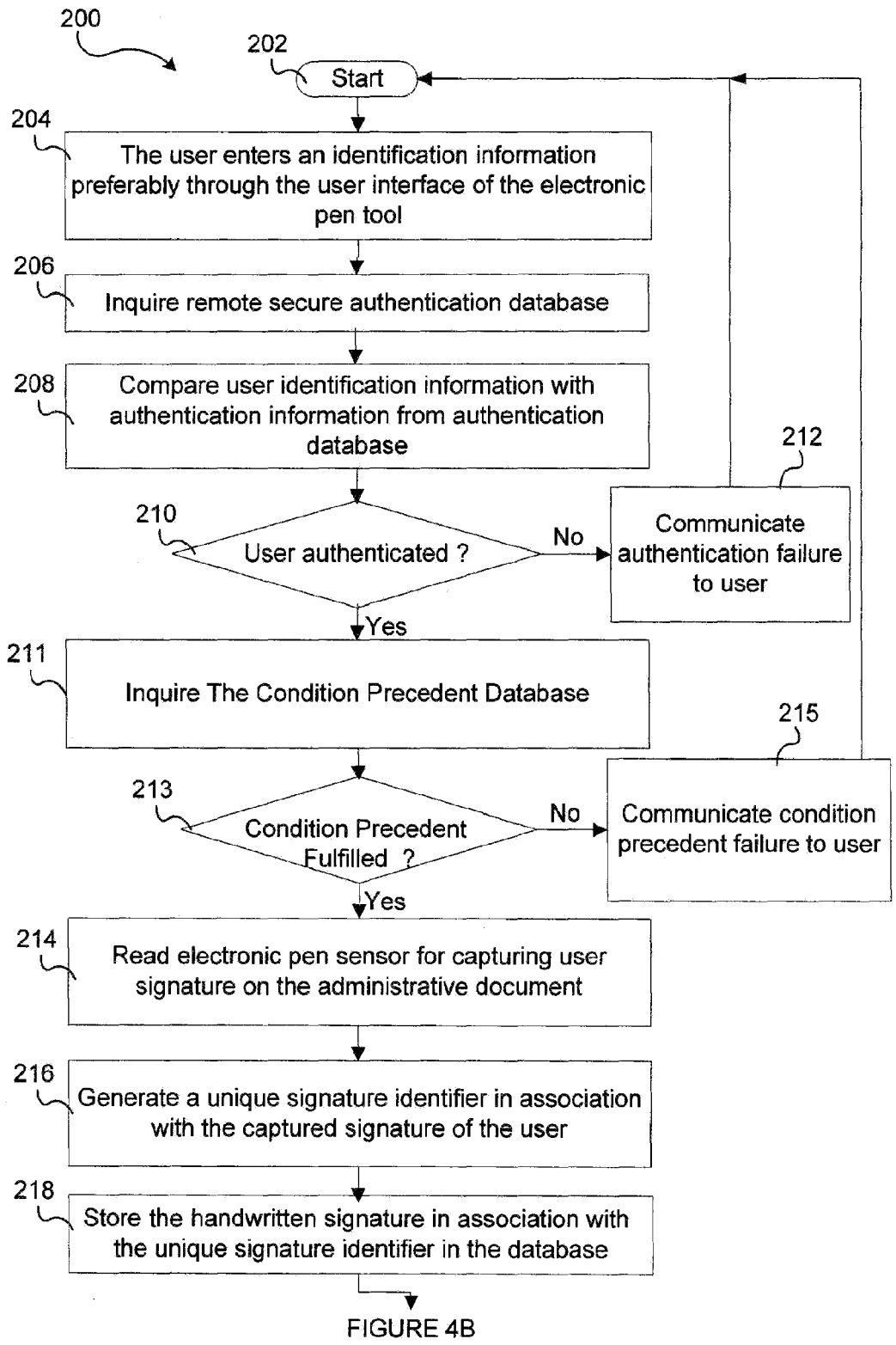
FIGS. 4A and 4B depicts a flow diagram of a method of registering and authenticating a handwritten signature in accordance with a preferred embodiment of the present invention.
Figure 4B:
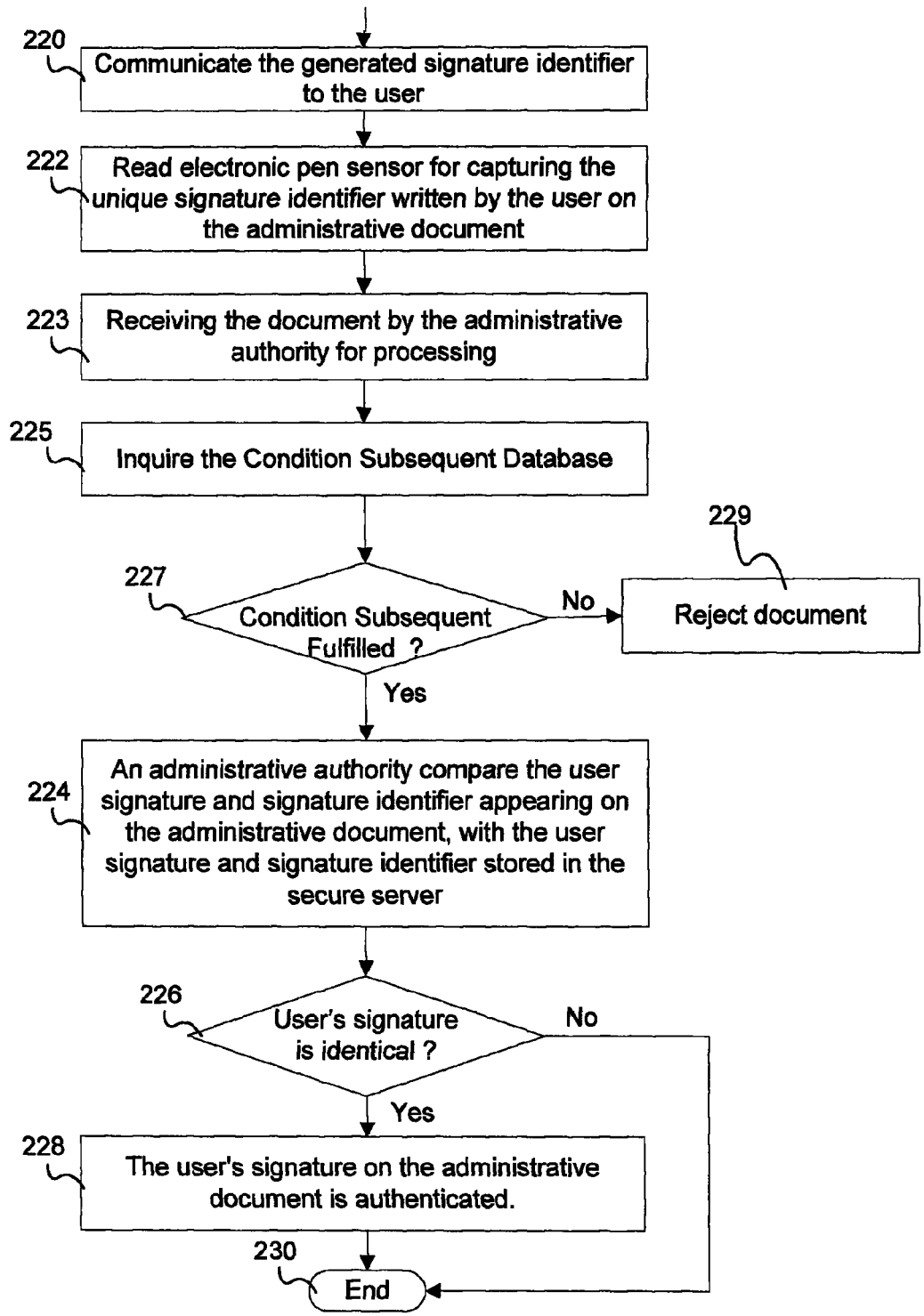
Figure 4C:
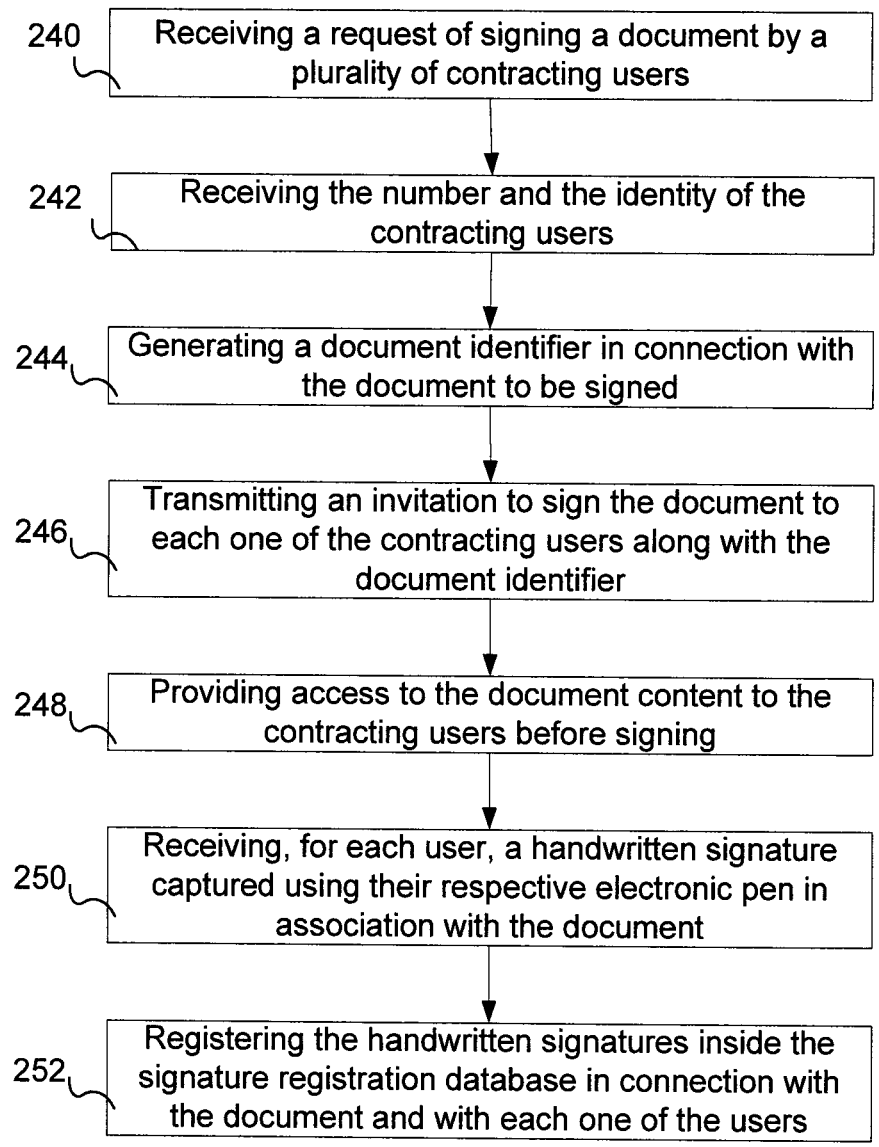
FIG. 4C depicts a flow diagram of a method of signing a document by a plurality of contracting parties in accordance with a preferred embodiment of the present invention.

As a further embodiment of the present invention, there is provided a method of registering signatures handwritten by a plurality of users in connection with a same document as illustrated in FIG. 4C. The method comprises a) receiving a request of signing a document by a plurality of contracting users 240; b) receiving the number and the identity of the contracting users 242; c) generating a document identifier in connection with the document to be signed 244; d) Transmitting an invitation to sign the document to each one of the contracting users along with the document identifier 246; e) providing access to the document content to the contracting users before signing 248; f) receiving, for each user, a handwritten signature captured using their respective electronic pen in association with the document 250; and g) registering the handwritten signatures inside the signature registration database in connection with the document and with each one of the users 252.

Generally, it is a user with an electronic pen who proceeds in initiating a process of signing a document by a plurality of contracting users where he specifies the number of contracting users and the identify of these contracting users he wishes to invite to sign the document. The electronic pen 10 sends the request to the secure server 80 that generates a document identifier (hereinafter "document ID"). The secure server 80 proceeds in sending an invitation to sign the document to each one of the specified contracting user with the document ID. Where a copy of the document is stored inside the signature registration database 112, the secure server grants an access privilege to these specified users to access the document stored in the database. These users can access the database 112 via the Web site 118 to view the document in order to verify its content. The users can then proceed in signing the document using their electronic pen 10. The signatures handwritten by the users are communicated to the secure server 80 that receives it and stores it inside the signature registration database 112 in connection with the document. This application can be carried out in the case where each one among the contracting users is a pre-registered user and is in possession of an electronic pen 10.

In case where the contracting users are located in the same physical location at the same moment, each one among them can sign the document at his round using his electronic pen. Where the contracting users are located within different physical locations, the document can be physically mailed to the contracting users' for receiving their signatures. In these cases, all the contracting users sign the same physical document.

The process for each user would be to authenticate himself/herself first using the electronic pen and then to proceed in entering the Document ID and signing the document using the electronic pen. The signatures are automatically captured by the electronic pen and transmitted to the signature registration database 112 for storage in association with the Document ID. The signature registration database 112 will then store the document ID mapped to the various signatures written by the various users.

This application is also configured to function when the contracting users are located within different physical locations, and this without being required to physically transmit the physical document to be signed from one physical location to another. This is done by storing a copy of the document in a database accessible to these users. The database can be the signature registration database 110 or an independent secure database. Each one among the contracting users can then access the stored document in order to make sure that it reflects his intentions before proceeding to the signature. This can be done, for instance, through a Web site 118 connected to the database. Each user enters the document ID using his electronic pen and proceeds to the signature which is received by the secure server management module 90 and stored inside the signature registration database 110 in connection with the given document. It should be understood that these users can sign on any piece of paper that is even not related to the document. The importance is signing after user identification and assigning the session to a specific document. Of course, the contract generator could be a secretary who is not even included in the contract, a lawyer or any authorized person who stores the contract into the database.

In the preferred embodiment, as illustrated in FIG. 2, the E-Pen Processing Unit 16 comprises a Multiple Signature Initiation Module 37 connected to the E-Pen Managing Module 26 for initiating a process of signing a document by a plurality of users. The User Interface 22 is configured to enable a user to provide instructions to initiate a process of signing a document by a plurality of users. This can be done for example using a menu displayed on the User Interface 22.

These instructions are captured by the User Input Reading Module 28 which transmit a signal with an indication of such instructions to the E-Pen Managing Module 26. The latter sends a signal to the Multiple Signature Module 37 in order to initiate the appropriate process. The Multiple Signature Initiation Module 37 first transmits a request to the first user (via the User Interface 22) in order to specify the identity of the users who he wishes to invite to sign the document. The User Interface 22 is configured to allow the user to specify the user identities.

The Multiple Signature Initiation Module 37 receives the identity of these users and transmits, for each user, a signature invitation via the data network 50. In the preferred embodiment, the invitation is sent to the other users through their respective electronic pens 10, which messages would appear on their respective User Interfaces 22. The users can then accept the invitation using the electronic pen 10, verify the content of the document by accessing the database where the document has been stored (can be done through a Web site 118 for example), and then proceed in signing the document. A person skilled in the art shall understand that the invitation can be sent to these users through their respective electronic pens 10 or through any other communication devices such as cell phones or emails along with the Document ID to be signed. When the invitation is sent using another communication device than the electronic pen 10, the invited user should use his electronic pen 10 to specify the Document ID in connection with which the signature is to be applied. The User Interface 22 and the Multiple Signature Initiation Module 37 are configured to enable such functionality.

E—Electronic Pen Tracking and Localisation

In another embodiment of the present invention, the electronic pen further comprises a GPS module for tracking the location of the electronic pen, and the secure server further comprises a location verification module. In fact, in order to further secure the signature registration (and authentication) system, users can a priori register one or more physical locations in which they foresee to use their electronic pen to sign administrative documents. These physical locations can consist of physical coordinates which delimit the boundaries of a given physical area within which the electronic pen will be used. The administrative authority stores this information in the authentication database, and during the authentication process, the secure server tracks the location of the electronic pen and compares it with the registered physical location(s). If the electronic pen is located outside of the physical location(s) registered in the database, the secure server will reject the authentication request without going further in the process.

For example, Ahmad Saleh is a patent attorney working in the province of Quebec, Canada, and wishes to use the system for registering (and authenticating) a handwritten signature applied on a document provided by his bank institution, the Royal Bank of Canada. Ahmad Saleh wants that the system rejects any authentication request that is carried out while the electronic pen is located outside of the physical boundaries of his place of work. He can ask the RBC to register, in the authentication database, the GPS coordinates of his office (ex. 45:30:05 N, 73:34:27 W). When Ahmad uses the electronic pen to sign an administrative document, the system will start by authenticating the user (Ahmad) as described hereinabove. During the authentication process, the system will track the location of the electronic pen, will compare it with the registered coordinates provided by Ahmad (his office coordinates) and will conclude if the electronic pen is physically located within the physical boundaries of Ahmad's office. If it is the case, the system will go further in the process by requiring the user name and password and so on as described hereinabove. Otherwise, if the tracked physical location of the electronic pen doesn't coincide with the registered physical location(s), the system can take further steps to ensure that it is not a fraudulent attempt, and at the limit the system can conclude to an unsuccessful authentication.

The system further allows users to specify the hours within which the electronic pen shall be used for signature and register this information inside the authentication database along with the physical coordinates. This can be seen as an enhanced security measure. In fact, this is to prevent the situation where a fraudulent person (ex. hacker) puts his hands on an electronic pen (ex. Ahmad Saleh's electronic pen) inside Ahmad's office (i.e. GPS coordinates that are registered inside the authentication database) when Ahmad is outside of the office (i.e. outside the normal office hours). In fact, unless the office hours are registered inside the authentication database, the system would have successfully authenticated the hacker since the later uses the electronic pen inside the secure region registered by Ahmad inside the authentication database.

The system can also comprise a notification module connected to a data network (ex. a mobile phone network), where the notification module will immediately communicate with the user (Ahmad) and notifies him about a possible fraudulent attempt to use his electronic pen outside of this office with an indication of the tracked position of the electronic pen where the attempt has been carried out. Ahmad can then report the stolen electronic pen and the fraudulent attempt to the police authority, with an indication of the physical location of the fraudulent party.

Other tracking means can also be used as an alternative or in conjunction with GPS tracking means in order to further secure the signature registration (and authentication) system. A person skilled in the art should understand that the scope of the present invention is not limited to particular tracking means but covers any tracking means suitable for tracking the location of the electronic pen and/or for identifying the device used for registering a signature. For example, since the electronic pen is connected to a data network via a network interface, each electronic pen can be associated with a unique Media Access Control address (MAC Address) and/or an IMEI and/or a static IP address that can be registered a priori in the authentication database in connection with the correspondent user. During the authentication process, the secure server tracks the MAC Address and/or the IMEI and/or the static IP address of the device requiring authentication and compares it with the MAC Address and/or the IMEI and/or the static IP address registered in the authentication database in connection with the identified user. If the compared MAC Addresses and/or the IMEI numbers and/or the static IP addresses (the tracked one(s) and the registered one(s)) are not identical, the secure server will reject the authentication request without going further in the process.

Also, if the electronic pen has been lost or stolen, the owner of the electronic pen (the user) can store such an alert in the authentication database which would, after identifying the electronic pen (using for example the MAC address), reject any authentication request using the given (stolen or lost) electronic pen.

The notification module can be configured to automatically transmit a signal warning of a fraudulent attempt. The notification signal can be transmitted to the registered user subject of the fraudulent attempt or to any other person such as the administrative authority and the police authority.

F—Signature Registration: Process

According to another preferred embodiment of the present invention, there is provided a method of registering (and authenticating) a handwritten signature. FIGS. 4A, 4B AND 4C illustrate, in the form of a flow chart diagram, a preferred embodiment of a method of registering and authenticating a handwritten signature in accordance with the present invention 200. The method illustrated hereinafter uses an electronic pen as a device for capturing a handwritten signature and to initiate a user authentication process with a remote secure server. However, a person skilled in the art shall understand that the electronic pen is used as an example to illustrate the essence of the method, and that any other scanning device with user authentication functionalities can be used.

Besides, the functionality of the present method is illustrated using a signatory signing an administrative document associated with an administrative authority. However, as mentioned hereinabove, a person skilled in the art shall understand that this is a particular application in a particular context in which the invention can be applied, and the method described hereinafter is merely an example of how such a method can be implemented.

A person skilled in the art shall also understand that the key element of the present invention is to authenticate the signatory by inquiring an authentication database, to map a unique signature identifier to a signature handwritten by said signatory, to acquire an electronic reproduction of the handwritten signature and to register (store) the latter along with the unique signature identifier in a signature registration database. The unique signature identifier is communicated to the user who shall communicate it to a party interested in authenticating the handwritten signature. The support which is used to write the signature can vary. For example, it can be a paper support, an electronic support or any other support. The type of document on which the signature is written can be any type of document, such as an administrative document, an agreement between two or more parties, a unilateral agreement or the like. Moreover, the involved parties can also vary. The signatory can be any individual and the interested party (who is interested to authenticate the signature) can be any individual, corporation or other entity (ex. a beneficiary of a signed cheque, a cosignatory of an agreement, an administrative authority, a government or the like). Moreover, the party managing or otherwise controlling user registration in the authentication database can be any trusted party, such as an interested party (party interested in authenticating certain type of documents—such as an administrative authority) or any independent party.

The first step consists of authenticating the user using the electronic pen 10. At an initial stage, the electronic pen 10 interrogates the user whether he wishes to initiates an authentication process. This can be done through a user interface 22 displaying a textual message to the user. The authentication process is initiated when the user responds positively to the message 202. Though the user interface 22 can consist of any suitable input/output device as described hereinabove (in the system description section), preferably, the user interface 22 consists of a micro touch screen enabling the user to enter textual data without need to any external device. When the user interface 22 comprises an audio input/output interface, the message transmitted by the electronic pen is an audio message and the user identification information is entered verbally by the user that is converted by the electronic pen 10 into a textual data format.

Once the authentication process has been initiated, the electronic pen inquires the user about his identification information, preferably by displaying a message thereto through the user interface 22. The user enters his identification information 204. Preferably, the user identification information is entered manually by the user using the user interface 22. In another embodiment, the user can handwrite the user identification information that is captured by the sensor means 12. When the user interface 22 comprises an audio input/output interface, the message transmitted by the electronic pen is an audio message and the user identification information is entered verbally by the user that is converted by the electronic pen into a textual data format.

After that the user identification information has been captured by the electronic pen 10, the latter sends an authentication request to the secure sever 80 in order to inquire the authentication database 206. The authentication process comprises searching the authenticating database and comparing the user identification information with the data records stored therein 208. If a match is found, the secure server transmits an indication of a successful authentication to the electronic pen 210. Otherwise, an indication of an unsuccessful authentication is transmitted 212, and an authentication failure message is communicated to the user of the electronic pen 10 through the user interface 22.

Preferably, the user identification information comprises a user name and a password and the information is entered through the same user interface 22. The user identification information can also comprise biometric information such as a fingerprint. In this case, the user interface 22 should comprise a biometric sensor capable of capturing the fingerprint of the user. If it is the case, for optimizing the authentication process, the identification information preferably comprises a combination of biometric information (such as a fingerprint) and an alphanumeric code (ex. National ID). The authentication database can then be inquired using the alphanumeric code first, and the captured biometric information (i.e. fingerprint) will be compared to the corresponding registered biometric information to verify if there is a match. By doing so, the authentication process is optimized since the system will not be required to compare the captured biometric information (i.e. fingerprint) with all biometric information (i.e. fingerprints) associated with all the users registered in the authentication database.

Once the user has been authenticated, the condition precedent verification module 93 inquires the condition precedent database 114 to find out if any condition precedent has been stored in connection with the given user 211. If a condition is found in records, the condition precedent verification module 93 verifies if the condition precedent has been fulfilled 213. In some cases, the condition precedent verification module 93 would need to interrogate the user through the electronic pen in order to find out if the condition precedent has been fulfilled (for example, in case of an unemancipated user, the question could be addressed to the user to verify the amount of the contract that the user wishes to sign). If the condition precedent is not fulfilled, the condition precedent verification module 93 transmits a failure notice to the user 215. If the condition precedent has been fulfilled, the secure server sends a positive signal to the E-Pen 10. At this stage, the user has the choice of signing a document or initiating a process of a signing a document by a plurality of users. If the user desires to sign a document with a plurality of other users, the process of signing a document by a plurality of users as described hereinabove and as illustrated in FIG. 4C is triggered.

As illustrated in FIGS. 4A and 4B, the electronic pen 10 invites the user to write his signature on the administrative document using the electronic pen. In the preferred embodiment, this operation is carried out by displaying a textual message to this effect on the user interface 22. At this phase, the electronic pen 10 is ready to capture any handwritten information using the sensor means 12. When the user handwrites his signature, the electronic pen 10 captures the handwritten signature and stores it inside the memory of the electronic pen 214.

Once the signature has been captured, the electronic pen 10 sends a request to the secure server 80 in order to register the handwritten signature in connection the unique signature identifier. The request comprises the captured handwritten signature. Upon reception of the signature registration request, the secure server generates a unique signature identifier in association with the captured handwritten signature of the user 216. The secure server notes the actual time and date which is deemed to be the time and date of the signature registration, and stores the handwritten signature in association with the unique signature identifier in the signature registration database 218. The date and time of the signature registration is also mapped to the unique signature identifier and stored in the same database 112.

It should be understood that the unique signature identifier can also be generated by the electronic pen 10 and transmitted to the secure server 80 along with the handwritten signature for registration. However, for security reasons and according to the preferred embodiment, the unique signature identifier is generated by the secure server 80 (at the secure server level).

Once the unique signature identifier is generated and registered in the signature registration database 112, it is communicated to the user via the user interface 220. The user shall indicate the unique signature identifier on the administrative document for future reference 222.

Once the administrative document is transmitted to the administrative authority for processing, the latter shall inquire the condition subsequent verification database 116 via the condition subsequent verification module 95 in order to find out if any condition subsequent is in record in connection with the given document 225. If any condition subsequent is in record, the condition subsequent verification module 95 verifies if the condition subsequent has been fulfilled 227. If the condition has not been fulfilled, the document is rejected 229. If the condition has been fulfilled, the administrative authority compares the hand written signature and unique signature identifier appearing on the administrative document with the hand written signature and the unique signature identifier stored in the signature registration database 224. If there is an identical match between the signature appearing on the administrative document and the registered signature 226, the administrative authority shall conclude to a successful authentication 228. Otherwise, the signature appearing on the administrative document shall be considered non authentic 230.

In another embodiment of the present invention, the electronic pen further comprises a GPS module for tracking the location of the electronic pen, and the secure server further comprises a location verification module. In fact, in order to further secure the signature authentication system, users can a priori register one or more physical locations in which they foresee to use their electronic pen to sign administrative documents. The administrative authority stores this information in the authentication database, and during the authentication process, the secure server tracks the location of the electronic pen and compares it with the registered physical location(s). If the electronic pen is located outside of the physical location(s) registered in the database, the secure server will undertake appropriate steps to avoid any fraudulent attempt, and at the limit reject the authentication request without going further in the process.

A person skilled in the art shall understand that the user identification information entered by the user through the user interface 20 of the electronic pen 10, described in step 204 of the authentication process, can consist of any of a National ID number, an alphanumeric personal acronym and password combination, or the like. Besides, as mentioned hereinabove, the user interface 20 can consist of an auxiliary keyboard and keyboard combination wirelessly connected to the electronic pen 10 and through which the user may enter his or her identification information. Alternatively, the identification information may be hand written by the user and captured by the sensor means 12 of the electronic pen 10.

A person skilled in the art shall understand that the comparison task described hereinabove (step 224) can be carried out manually by an administrative agent. It can also be semi-automated by a suitable graphic comparison software application that compares the hand written signature appearing on the administrative document with the handwritten signature registered in the signature registration database 112.

A person skilled in the art shall understand that the electronic pen 10 can be used for signing and authenticating administrative documents associated with more than one administrative authority. In this case, at the initiation phase of the authentication process, the user selects the appropriate administrative authority (among a plurality of administrative authorities). The appropriate administrative authority is the one with whom the administrative document is associated and the handwritten signature shall be registered. Preferably, at an initial stage, the electronic pen displays to the user, via the user interface 22, a list of administrative authorities among which the user has to select the one in connection with whom the authentication process shall be carried out.

Handwritten Data Archiving System

Figure 5:
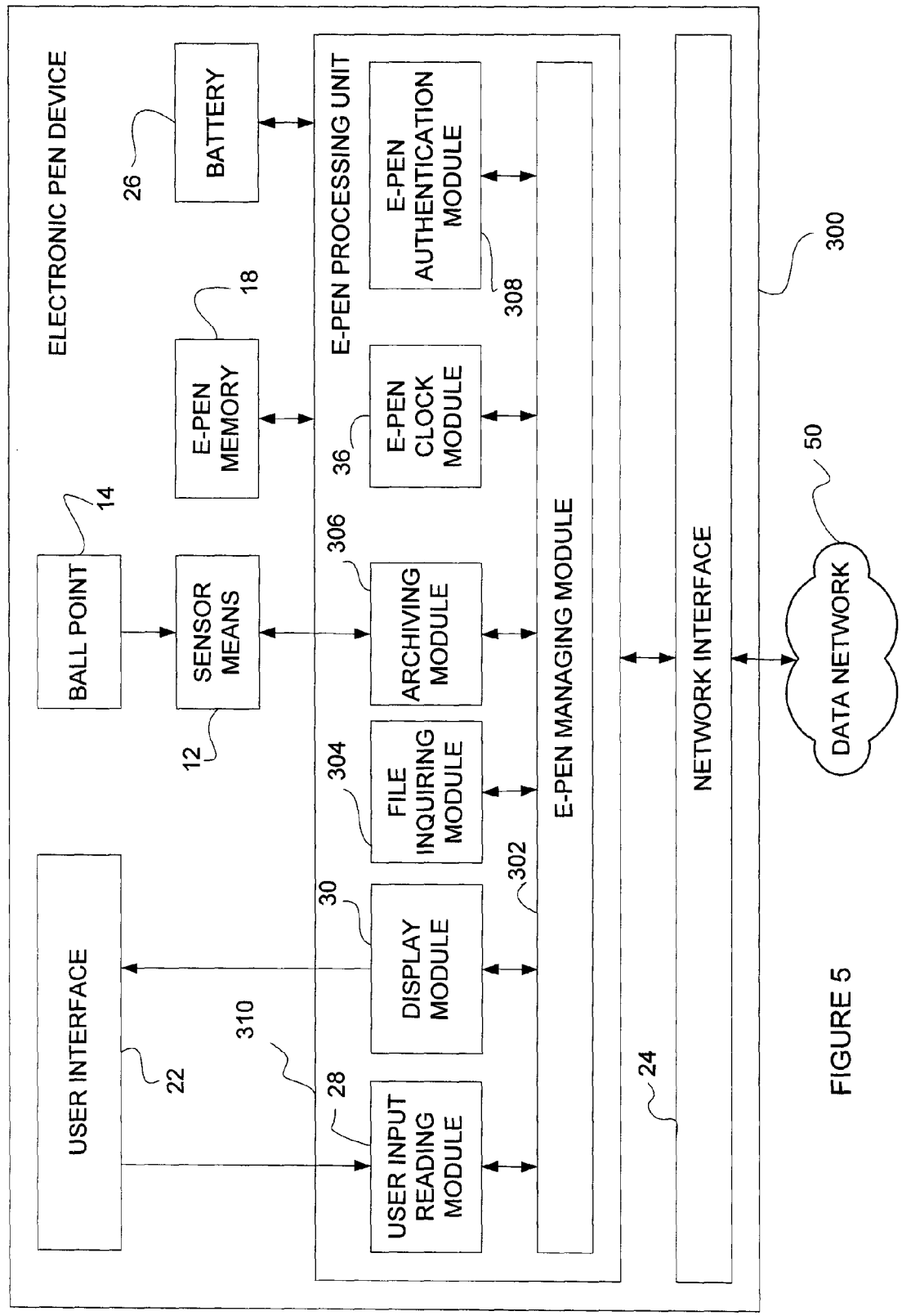
FIG. 5 depicts a block diagram of an electronic pen device configured to be used with a secure server for archiving handwritten information in accordance with a preferred embodiment of the present invention.

As another aspect of the invention and as illustrated in FIG. 5, there is provided an electronic pen device configured to be used with a secure server for archiving handwritten information 300. The main objective of the present aspect of the invention is to enable a user to handwrite information, where the handwritten information is automatically captured by the electronic pen, processed and converted into an electronic format document and transmitted to an archiving database to be classified and stored in an appropriate folder chosen by the user using the electronic pen. The main application is when the information is handwritten by the user on a paper format document, however a person skilled in the art shall understand that the device can operate with any other support, such as an electronic support.

FIG. 5 illustrates an electronic pen device configured to be used with a secure server for archiving handwritten information 300, in accordance with a preferred embodiment of the present invention. The electronic pen device is adapted to capture and process handwritten information, to associate capture handwritten information with a specified file identifier, and to communicate with a remote secure server for classifying and storing captured handwritten information in association with the specified file identifier.

The electronic pen device 300 shall be used by a user to handwrite information related to his files. The electronic pen that is used to data process and archive handwritten information is substantially similar to the electronic pen that is used for authenticating a signature in accordance with the first aspect of the present invention, but with different modules that are adapted to carry out different functionalities.

The electronic pen 300 in accordance with the present aspect of the invention comprises sensor means 12, a ball point 14, an e-pen processing unit 310, an e-pen memory 18, a housing 20, a user interface 22, an e-pen network interface 24 and a battery 26. The remote secure server 320 comprises a server network interface 322, a server processing unit 328, an authentication database 332 and an archive database 334.

A person skilled in the art shall understand that the electronic pen device 300 can be adapted to carry out multiple functionalities comprising authenticating a signature and archiving handwritten information. As mentioned hereinabove, the electronic pen 10 may be preferably represented by a substantially pen-shaped body defined by the housing 20. The housing 20 houses one or more integrated circuits and other electronic components which comprises the sensor means 12, the ball point 14, the e-pen processing unit 310, the e-pen memory 18, the user interface 22, the e-pen network interface 24 and the battery 26.

The sensor means 12 consist of any known technology capable of capturing handwritten information drawn by the ball point 14, such as, a movement sensor, an infrared or laser tracking device, an optical sensor or any other suitable technology. Preferably, the sensor means 12 comprise a combination of a movement sensor and an appropriate tracking device capable of capturing information handwritten by a user with a sufficient high resolution such that the captured information can be reproduced with a substantially high degree of accuracy. The tracking device is preferably an infrared device appropriately mounted for tracking the emplacement of the handwritten information with respect to the paper document where the information is written.

The e-pen processing unit 310 is the central element of the electronic pen and is connected to the sensor means 12, to the e-pen memory 18, to the user interface 22 and to the network interface 24. The e-pen processing unit 310 is responsible for coordinating all the operations of the other components of the electronic pen, in accordance with pre-defined instructions. The e-pen processing unit 310 comprises an e-pen microprocessor (or microcontroller) for executing instructions (not shown), an e-pen managing module 302, a user input reading module 28, a display module 30, an e-pen authentication module 308, an archiving module 306, a file inquiring module 304 and an e-pen clock module 36.

The e-pen managing module 302 is responsible for controlling and coordinating all data and commands that are exchanged between the e-pen processing unit 310 and the other components of the electronic pen, knowing the user interface 22, the e-pen network interface 24 and the sensor means 12. The e-pen managing module 310 is also responsible for controlling and coordinating the execution of all the other modules of the processing unit 310 and, thus, is connected to each one of these modules, knowing the user input reading module 28, the display module 30, the e-pen authentication module 308, the archiving module 306, the file inquiring module 304 and the clock module 36.

As will be discussed more in details hereinafter, the user interface 22 communicates to the user various messages and instructions, such as instructions to enter identification information and instructions to select or to enter a file number. The user interface 22 is used by the user to enter data, such as his identification information and a file number in association with which the handwritten information will be mapped.

Figure 6:
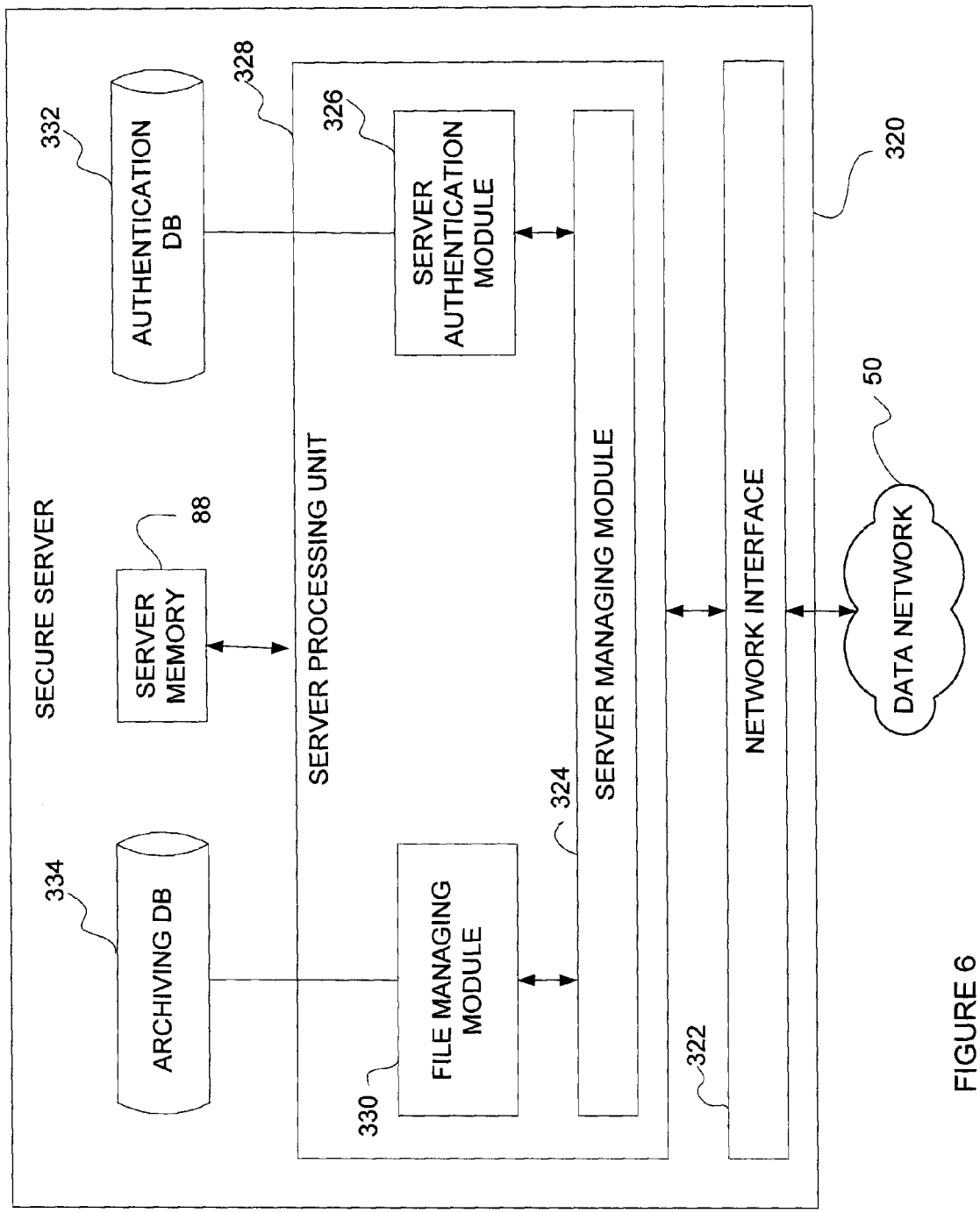
FIG. 6 depicts a block diagram of secure server configured to be used with an electronic pen device for archiving handwritten information in accordance with a preferred embodiment of the present invention.

The electronic pen device 300 is adapted to communicate with a remote secure server 320 for user authentication and archiving purposes. As shown in FIG. 6, the secure server 320 comprises a server network interface 322, a server processing unit 328, an authentication database 332 and an archive database 334. The remote secure server 320 may consist of a single or a plurality of servers, and the databases 332 and 334 can be locally or remotely connected to the archive server 320.

The server processing unit 328 is connected to the server network interface 322, to the authentication database 332 and to the archive database 334. The server processing unit 328 is responsible for coordinating all the activities of the secure server in accordance with predefined instructions set up by the different modules defined hereinafter. The server processing unit 328 comprises a server microprocessor (or microcontroller) for executing instructions (not shown), a server managing module 324, a server authentication module 326 and a file managing module 330.

At an initial stage, the e-pen managing module 302 transmits a signal instructing the display module 30 to display on the user interface 22 a message asking the user if he wishes to use the electronic pen for archiving handwritten information. The display module 30 proceeds in displaying such a message on the user interface 22 and confirms the same to the e-pen managing module 302. Then, the e-pen managing module 302 transmits a signal to the user input module 28 instructing the latter to read the data entered by the user via the user interface 22. The user input reading module 28 reads the data and transmits it to the e-pen managing module 302 upon reception.

If the answer is positive, the e-pen managing module 302 transmits a signal to the display module 30 instructing the latter to display a message asking the user to enter his identification information for authentication purposes. The authentication process is substantially similar to the authentication process carried out in the frame of the system, device and method for registering (and authenticating) a handwritten signature.

The display module 30 displays the message on the user interface 22 and confirms the same to the e-pen managing module 302 which instructs the user input reading module 28 to read the data entered by the user via the user interface 22. When the identification information is entered by the user, the user input reading module 28 transmits the identification information to the e-pen managing module 302. The latter transmits a signal to the e-pen authentication module 32 with an instruction to prepare and transmit an authentication request to the secure server 320 in order to authenticate the user. The e-pen authentication module 308 prepares an authentication request (using a database language corresponding to the language used by the authentication database 332—such as SQL) comprising the user identification information and transmits it to the secure server 320.

The authentication request is received by the server managing module 324 which acquires the request and transmits it to the server authentication module 326 with an instruction to inquire the authentication database 332. The server authentication module 326 inquires the authentication database 332 using the identification information embedded in the authentication request. The server authentication module 326 transmits an authentication response to the server managing module 324 comprising an indication if a successful or unsuccessful authentication.

The server managing module 324 receives the authentication response from the server authentication module 326. If an unsuccessful authentication, the server managing module 324 transmits an indication of an unsuccessful authentication to the e-pen authentication module 308 (at the electronic pen side) through the data network 50. The e-pen authentication module 308 transmits an authentication failure signal to the e-pen managing module 302 which instructs the display module 30 to display a failure authentication message to the user via the user interface 22.

If a successful authentication, the sever managing module 324 generates an encryption code unique to the given user and transmits to the e-pen authentication module 308 a signal comprising an indication of a successful authentication as well as the generated encryption code that the electronic pen 10 shall use to encrypt all subsequent messages transmitted to the secure server 320. The e-pen authentication module 308 transmits an indication of a successful authentication along with the encryption code to the e-pen managing module 302 which instructs the display module 30 to display to the user a message of a successful authentication along with a message instructing the user to specify a file number in connection with which the handwritten information will be mapped.

At this phase, the archiving process is initiated. The e-pen managing module 302 transmits a signal to the input reading module 28 instructing the latter to read the file number specified by the user. The input reading module 28 reads the file number and sends it to the e-pen managing module 302. The latter instructs the file inquiring module 304 to verify if the specified file number exists in the archive database 334.

The file inquiring module 304 transmits, via the data network 50, a file inquiring request comprising the file number to the secure server 320. The request is received by the server managing module 324 which transmits the file inquiring request to the file managing module 330. The file managing module 330 search the archive database 334 as a function of the specified file number. The file managing module 334 sends back an inquiring response to the server managing module 324 with an indication whether the specified file exists or not. The server managing module 324 transmits the file inquiring response to the electronic pen 10 via the data network 50. The e-pen managing module 302 receives the file inquiring response.

If the file number doesn't exist in the archive database 334, a message is displayed to the user to this effect. The e-pen 10 gives the user the option to create a new file with the specified file number or to indicate another file number. If the user elects to create a new file number, the file inquiring module 304 sends a file creation request to the secure server 320. The request is transferred to the file managing module 330 which opens, inside the archive database 334, a new folder having the specified file number. A confirmation to this effect is transmitted to the e-pen 300 and a confirmation message is displayed to the user.

If the file number exists in the archive database 334 (or if a new file is successfully created), the e-pen managing module 302 transmits the file number to the data archiving module 306 with an instruction to map any received handwritten information with the specified file number. The e-pen managing module 302 instructs the display module 30 to display to the user a message confirming that the file exists (or has been created) and that the e-pen is active to receive handwritten information in association with the specified file number.

From that instant, any information handwritten by the user using the e-pen 10 is automatically captured by the sensor means 12 and transmitted to the data archiving module 306 to be stored inside the e-pen memory 18 in association with the specified file number. The data archiving module 306 continues to map all received handwritten information with the specified file number as long as it doesn't receive any instructions to the contrary.

When the user has finished writing information in connection with the specified file number, he can put end to the process by instructing the e-pen 10 to this effect using the user interface 22. Technically, this is carried out as follow: the e-pen managing module 302 instructs the display module 30 to display on the user interface 22 an option to terminate the process of capturing handwritten information in connection with the specified file number. The e-pen managing module 302 instructs the input reading module 28 to read any information entered by the user to this effect. When the input reading module 28 receives an instruction from the user to terminate the process, it informs the e-pen managing module 302 of the fact. The e-pen managing module 302 sends a signal to the data archiving module 306 instructing the latter to finalise the process of capturing information in connection with the specified file number and to archive the handwritten information that has been received in connection therewith.

The data archiving module 306 retrieves the handwritten information that has been received in connection with the specified file number from the e-pen memory 18, creates a document incorporating the handwritten information, and transmits the document to the secure server 320 with a request to archive the document in the archiving database 334 in connection with the specified file number. The archiving request is received by the server managing module 324 and transmitted to the file managing module 330 for processing. The file managing module 330 retrieves the document and the specified file number and stores the document inside the archive database 334, in connection with the specified file number. A confirmation message is transmitted to the electronic pen 10 and displayed to the user.

In the preferred embodiment, when the data archiving module 306 receives instructions to archive the handwritten information, it acquires the actual date and time from the clock reading module 36 and integrates it inside the created document. The user can also be asked to give a title to the created document which will be incorporated in the header of the document.

Figure 7:
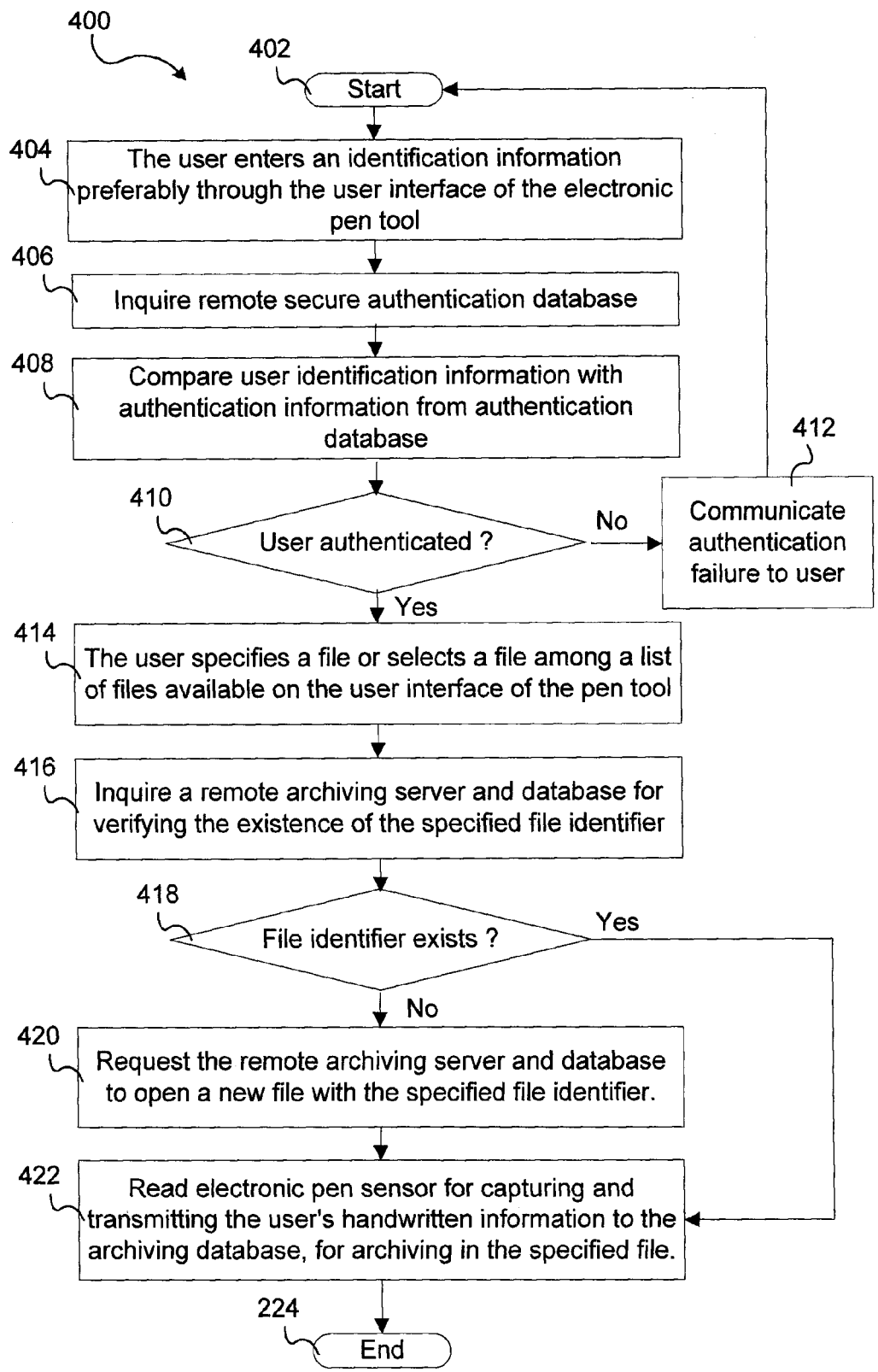
FIG. 7 depicts a flow diagram of a method of archiving handwritten information using an electronic pen device in accordance with a preferred embodiment of the present invention.

According to a further aspect of the present invention, there is provided a method of archiving handwritten information using an electronic pen. FIG. 7 shows, in the form of a flow chart diagram, a preferred embodiment of a method of archiving handwritten information using an electronic pen device in accordance with the present invention 400.

The first step consists of authenticating the user using the electronic pen. At an initial stage, the electronic pen interrogates the user whether he wishes to initiates an archiving process. This can be done through a user interface 22 displaying a textual message to the user. The archiving process is initiated when the user responds positively to the message 402. Though the user interface 22 can consist of any suitable input/output device as described hereinabove, preferably, the user interface 22 consists of a micro touch screen enabling the user to enter textual data without need of any external device. When the user interface 22 comprises an audio input/output interface, the message transmitted by the electronic pen is an audio message and the user identification information is entered verbally by the user that is converted by the electronic pen into a textual data format.

Once the authentication process has been initiated, the electronic pen inquires the user about his identification information, preferably by displaying a message thereto through the user interface 22. The user enters his identification information 404. Preferably, the user identification information is entered manually by the user using the user interface 22. In another embodiment, the user can handwrite the user identification information that is captured by the sensor means 12. When the user interface 22 comprises an audio input/output interface, the message transmitted by the electronic pen is an audio message and the user identification information is entered verbally by the user that is converted by the electronic pen into a textual data format.

After that the user identification information has been captured by the electronic pen 10, the latter sends an authentication request to the archive sever 320 in order to inquire the authentication database 406. The authentication process comprises searching the authenticating database 332 and comparing the user identification information with the data records stored therein 408. If a match is found 410, the archive server 320 transmits an indication of a successful authentication to the electronic pen. Otherwise, an indication of an unsuccessful authentication is transmitted, and an authentication failure message is communicated to the user of the electronic pen 10 through the user interface 22 of the pen 412.

Preferably, the user identification information comprises a user name and a password and the information is entered through the same user interface 22. The user identification information can also comprise biometric information such as a fingerprint. In this case, the user interface 22 should comprise a biometric sensor capable of capturing the fingerprint of the user. If it is the case, for optimizing the authentication process, the identification information preferably comprises a combination of biometric information (such as a fingerprint) and an alphanumeric code (ex. National ID). The authentication database can then be inquired using the alphanumeric code first, and the captured biometric information (i.e. fingerprint) will be compared to the corresponding registered biometric information to verify if there is a match. By doing so, the authentication process is optimized since the system will not be required to compare the captured biometric information (i.e. fingerprint) with all biometric information (i.e. fingerprints) associated with all the users registered in the authentication database.

Once the user has been authenticated, the electronic pen 10 invites the user to specify a file number in connection with which the captured handwritten information will be mapped. In the preferred embodiment, this operation is carried out by displaying a textual message to this effect on the user interface 22. At this phase, the electronic pen is ready to capture any handwritten information using the sensor means 12. The electronic pen 10 can also display a list of available files to the user among which he is invited to select one specific file.

Once the file number has been specified by the user 414, the electronic pen inquires the archive database 334 for verifying existence of the specified file number 416. If the specified file number doesn't exist, the user is notified and is asked whether he wishes to open a new file with the specified file number. If it is the case, the electronic pen 10 transmits a request to the secure server 320 to open a new file with the specified file number 420.

If the file number exists in the archive database 334 (or if a new file is created), the electronic pen captures the information handwritten by the user, creates a document incorporating the handwritten information and transmits it to the secure server 334 to be stored in the specified file of the archive server 422.

It is to be understood that an existing file accessed by the authenticated user, as described by the authentication process, may represent an existing folder, an existing text file, as well as existing secured software, a secured operating system, or the like.

Preferably, the user interface 22 can comprise an easily accessible push button near the tip end of the electronic pen tool, a virtual push button on the micro touch display screen, a list of voice enabled commands, or the like, for enabling the user to enter a new line of text, insert a new page separation, terminate the archiving process and initiate the creation of a document incorporating the captured handwritten information or the like. It should be understood that no ink need to be expelled from the tip of the pen tool during such commands It should be understood that the e-pen can also comprise other modules in order to provide further functionalities, such as a translation module for translating any word captured by the e-pen or any term received from the server. Moreover, by using the GPS chip the e-pen user can access an account of his own through a 118 and then manage his file accordingly where he can choose specific files to be used within specific location and other than these locations these files should be locked and never used (As an example).

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

Although the above description contains many specificities, these should not be construed as limitations on the scope of the invention but is merely representative of the presently preferred embodiments of this invention. The embodiment(s) of the invention described above is(are) intended to be exemplary only. The scope of the invention is therefore intended to be limited solely by the scope of the appended claims.

The invention claimed is:

1. An electronic pen device configured to be used with a remote secure server for registering handwritten signatures, said remote secure server comprising an authentication database storing authentication information in connection with pre-registered users and a signature registration database for registering handwritten signatures, the electronic pen device comprising:

a body in the form of a pen enclosing an input/output (I/O) interface; a memory; a tip and a sensor connected thereto for capturing handwritten signatures; a network interface configured to be connected to a data network, and a processing unit connected to said I/O interface, to said sensor, to said memory and to said network interface;

where said electronic pen device is configured to:

establish a remote data communication with the remote secure server via the data network and a communication with a user desiring to sign a document via the I/O interface for approving a content of the document;

obtain personal identification information from the user via the I/O interface;

authenticate said user by inquiring said remote secure server if the user is an authentic pre-registered user among the pre-registered users, said authentication comprising determining if there is a match between the personal identification information specified by the user and the authentication information stored in the remote secure server in connection with the user;

receive a notification of successful or unsuccessful authentication from the remote secure server via the data network based on the match determination;

receive a request from the user to sign a document;

reject said request from the user to sign a document in case of receipt of a notification of unsuccessful authentication from the remote secure server;

accept said request from the user to sign a document only if and subsequent to a receipt of a notification of successful authentication by the electronic pen device from the remote secure server, said acceptance comprising transmitting a handwritten signature handwritten by said user in association with the document handwritten signature, approving the content of the document, from the electronic pen device to the remote secure server for storage inside the signature registration database;

subsequent to the storage of the handwritten signature in the remote secure server, receive from the remote secure server via the data network and communicate to the user via the I/O interface a unique signature identifier generated by the remote secure server and stored inside the signature registration database in connection with the stored handwritten signature, wherein said unique signature identifier is sent to the user by the electronic pen device for association with the document that has been signed and wherein said unique signature identifier is for the purpose of indication on the document together with the handwritten signature for use as a reference during future authentication of said document comprising determining if there is an exact match between the signature stored in the remote secure server and the signature appearing on said document.

2. The electronic pen device as claimed in claim 1, wherein said remote secure server further comprises a condition subsequent database for storing conditions subsequent associated with handwritten signatures registered inside said signature registration database, and where said electronic pen device is configured to enable a user to input a condition subsequent associated with a signature handwritten thereby, and to transmit said condition subsequent to said remote secure server via said data network for storage in connection with said handwritten signature inside said condition subsequent database for future inquiry.

3. The electronic pen device as claimed in claim 1, where said electronic pen device is further configured to enable a user to input user identification information associated with at least one other user and to initiate a request to invite said at least one other user to sign a document, where said electronic pen device transmits said invitation request and said user identification information to said remote secure server for generating a unique document identifier and for transmitting an invitation to sign said document comprising said unique document identifier to said at least one other user.

4. The electronic pen device as claimed in claim 1, where said electronic pen device is further configured to receive through said data network an invitation to sign a document comprising a unique document identifier, to communicate a message about said invitation to a user in possession of said electronic pen device, to capture a signature handwritten by said user in association with said document and to transmit said handwritten signature to said remote secure server along with said unique document identifier via said data network for storage inside said signature registration database.

5. The electronic pen device as claimed in claim 1, wherein said personal identification information comprises a user name and a password which is specified by said user using said I/O interface.

6. The electronic pen device as claimed in claim 1, wherein said unique signature identifier is generated by said remote secure server and is transmitted to said electronic pen device via said data network.

7. The electronic pen device as claimed in claim 1, wherein said authentication information comprises physical coordinates defining a security region within which said electronic pen device shall be located, said electronic pen device further comprising a GPS chip for tracking a physical location of said electronic pen device, wherein said authenticating said user comprises inquiring said remote secure server for verifying if said tracked physical location is within said security region.

8. A system for use with an electronic pen device for receiving and registering handwritten signatures, the system comprising:

a remote secure server configured to be in remote data communication with the electronic pen device, the remote secure server comprising an authentication database comprising authentication information associated with pre-registered users, a signature registration database for registering handwritten signatures received from pre-registered users in association with signed documents, and a network interface configured to be connected to a data network;

the remote secure server being configured to:

receive a request from the electronic pen device for registering a handwritten signature comprising personal identification information associated with a user requesting to sign a document using the electronic pen device;

authenticate the user by verifying if the user is an authentic pre-registered user among the pre-registered users using the authentication information and said personal identification information, said authentication comprising determining if there is a match between the personal identification information specified by the user and the authentication information stored in the remote secure server in connection with the user;

in case of an unsuccessful authentication, send a notification of unsuccessful authentication to the electronic pen device for rejecting the request to sign the document;

only in case of and subsequent to a successful authentication, send a notification of successful authentication to the electronic pen device for accepting the request to sign the document, receive a signature handwritten by said user in association with the document, generate a unique signature identifier associated with said document, store said handwritten signature inside said signature registration database in association with the unique signature identifier, and transmit said unique signature identifier to said electronic pen device for indication on the document in order to be used as a reference during future authentication of the document;

where said future authentication of said document comprises retrieving the unique signature identifier as indicated on the document; querying the remote secure server using this unique signature identifier to retrieve the stored signature associated with the unique signature identifier and determining if there is an exact match between the signature stored in the remote secure server and the signature appearing on said document.

9. The system as claimed in claim 8, wherein the electronic pen device is the electronic pen device of claim 1.

10. The system as claimed in claim 8, the remote secure server comprising a condition precedent database storing conditions precedent associated with at least a part of said pre-registered users, wherein said remote secure server is configured to inquire said condition precedent database about any condition precedent in record in connection with said user, and if it is the case, to verify if said condition precedent has been fulfilled, where said remote secure server is configured to reject said request of registering a handwritten signature if a condition precedent is found in record and said condition precedent has not been fulfilled.

11. The system as claimed in claim 10, the remote secure server further comprising a condition subsequent database storing conditions subsequent associated with handwritten signatures stored in said signature registration database, the remote secure server being configured to inquire said condition subsequent database about any condition subsequent in record in connection with a given handwritten signature, and if it is the case, to verify if said condition subsequent has been fulfilled.

12. The system as claimed in claim 11, further comprising a Web site connected to said condition subsequent database to allow pre-authorized persons to add and edit conditions subsequent.

13. The system as claimed in claim 9, wherein said electronic pen device is further configured to enable said user to input user identification information associated with at least one other user, to enable said user to initiate a request to invite said at least one other user to sign a document, to transmit said invitation request and said user identification information to the remote secure server through said data network, where said remote secure server is configured to generate a unique document identifier and to transmit an invitation to sign said document comprising said unique document identifier to said at least one other user.

14. The system as claimed in claim 9, wherein said electronic pen device is further configured to receive through said data network an invitation from another user to sign a document comprising a unique document identifier, to communicate a message about said invitation to said user in possession of said electronic pen device, to capture a signature handwritten by said user in association with said document and to transmit said handwritten signature to said remote secure server along with said unique document identifier via said data network for storage inside said signature registration database.

15. The system as claimed in claim 9, wherein said authentication information comprises physical coordinates defining a security region within which said electronic pen device shall be located, said electronic pen device further comprising a GPS module for tracking a physical location thereof, wherein said authenticating said user comprises inquiring said authentication database for verifying if said tracked physical location is within said security region.

16. A method of authenticating handwritten signatures, the method comprising:

receiving, at an electronic pen device, a request from a user for signing a document, the request comprising personal identification information associated with said user;

automatically authenticating, the user by said electronic pen device, using said personal identification information by inquiring a remote secure server comprising an authentication database storing authentication information in connection with pre-registered users, said authentication of the user comprising determining if there is a match between the personal identification information specified by the user and the authentication information stored in the remote secure server in connection with the user, in case of an unsuccessful authentication, automatically transmitting by the remote secure server to the electronic pen device a notification of unsuccessful notification, and said electronic pen device rejecting the request for signing the document;

in case of and subsequent to a successful authentication, automatically transmitting by the remote secure server to the electronic pen device a notification of successful authentication and said electronic pen device accepting the request to sign the document, receiving by the electronic pen device and transmitting to the remote secure server a handwritten signature of the user approving a content of the document, automatically storing by the remote secure server said handwritten signature inside a signature registration database, automatically generating by said remote secure server a unique signature identifier and associating said unique signature identifier to said handwritten signature, and automatically communicating said unique signature identifier to said electronic pen device, and communicating said unique signature identifier by the electronic pen device to the user for indication on the document in order to be used as a reference during future authentication of said document;

during authentication of the document, providing access to said signature registration database for enabling an authenticating party to authenticate said document, where said authentication of said document comprises retrieving the unique signature identifier as indicated on the document; querying the remote secure server using this unique signature identifier to retrieve the stored signature associated with the unique signature identifier and determining if there is an exact match between the signature stored in the remote secure server and the signature appearing on said document.

* * * * *